United States Patent
Agrawal et al.

(10) Patent No.: US 12,026,132 B2
(45) Date of Patent: Jul. 2, 2024

(54) STORAGE TIERING FOR COMPUTING SYSTEM SNAPSHOTS

(71) Applicant: Rubrik, Inc., Palo Alto, CA (US)

(72) Inventors: Shivanshu Agrawal, Seattle, WA (US); Gaurav Maheshwari, Jaipur (IN); Anuj Mittal, Mathura (IN); Kritagya Dabi, Indore (IN); Nitin Patil, Bangalore (IN); Arpit Kathuria, Chandigarh (IN); Archit Gupta, Mountain View, CA (US); Srikanth Hanumanula, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/840,262

(22) Filed: Jun. 14, 2022

(65) Prior Publication Data

US 2023/0401176 A1    Dec. 14, 2023

(51) Int. Cl.
*G06F 17/00* (2019.01)
*G06F 7/00* (2006.01)
*G06F 16/11* (2019.01)
*G06F 16/16* (2019.01)
*G06F 16/185* (2019.01)

(52) U.S. Cl.
CPC .......... *G06F 16/185* (2019.01); *G06F 16/116* (2019.01); *G06F 16/128* (2019.01); *G06F 16/164* (2019.01)

(58) Field of Classification Search
CPC .... G06F 16/185; G06F 16/164; G06F 16/116; G06F 16/128

USPC .......................................................... 707/694
See application file for complete search history.

(56) References Cited

U.S. PATENT DOCUMENTS

| | | | |
|---|---|---|---|
| 10,031,675 B1* | 7/2018 | Veprinsky | G06F 3/0688 |
| 2007/0255759 A1* | 11/2007 | Akelbein | G06F 16/122 |
| | | | 707/999.2 |
| 2012/0233315 A1* | 9/2012 | Hoffman | G06F 9/5072 |
| | | | 709/224 |
| 2012/0260040 A1* | 10/2012 | Mallge | G06F 16/278 |
| | | | 711/E12.016 |
| 2013/0117515 A1* | 5/2013 | Ashmore | G06F 11/3433 |
| | | | 711/162 |
| 2013/0238575 A1* | 9/2013 | Amarendran | G06F 16/21 |
| | | | 707/694 |
| 2014/0344234 A1* | 11/2014 | Amarendran | G06F 16/21 |
| | | | 707/694 |

(Continued)

*Primary Examiner* — Pavan Mamillapalli
(74) *Attorney, Agent, or Firm* — Holland & Hart LLP

(57) ABSTRACT

A data management system (DMS) may facilitate the storage tiering of snapshots on cloud environments. For example, the DMS may transmit snapshot signaling to a first cloud environment that instructs the first cloud environment to capture a first snapshot of a computing object and to store the first snapshot in a first type of cloud storage at the first cloud environment. The DMS may determine that the first snapshot has been stored in the first type of cloud storage for a duration of time that satisfies an archival threshold. Based on the archival threshold being satisfied, the DMS may transmit archival signaling that instructs the first cloud environment to store the first snapshot to a second type of cloud storage. The second type of cloud storage may be associated with a longer access latency than the first type of cloud storage.

19 Claims, 10 Drawing Sheets

(56) References Cited

U.S. PATENT DOCUMENTS

2018/0232395 A1* 8/2018 Deshmukh ............ G06F 3/0643
2019/0004735 A1* 1/2019 Spillane ................. G06F 12/02
2020/0021537 A1* 1/2020 Oliveira ................. H04L 47/72

* cited by examiner

STORAGE TIERING FOR COMPUTING SYSTEM SNAPSHOTS

FIELD OF TECHNOLOGY

The present disclosure relates generally to data management, and more specifically to storage tiering for computing system snapshots.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
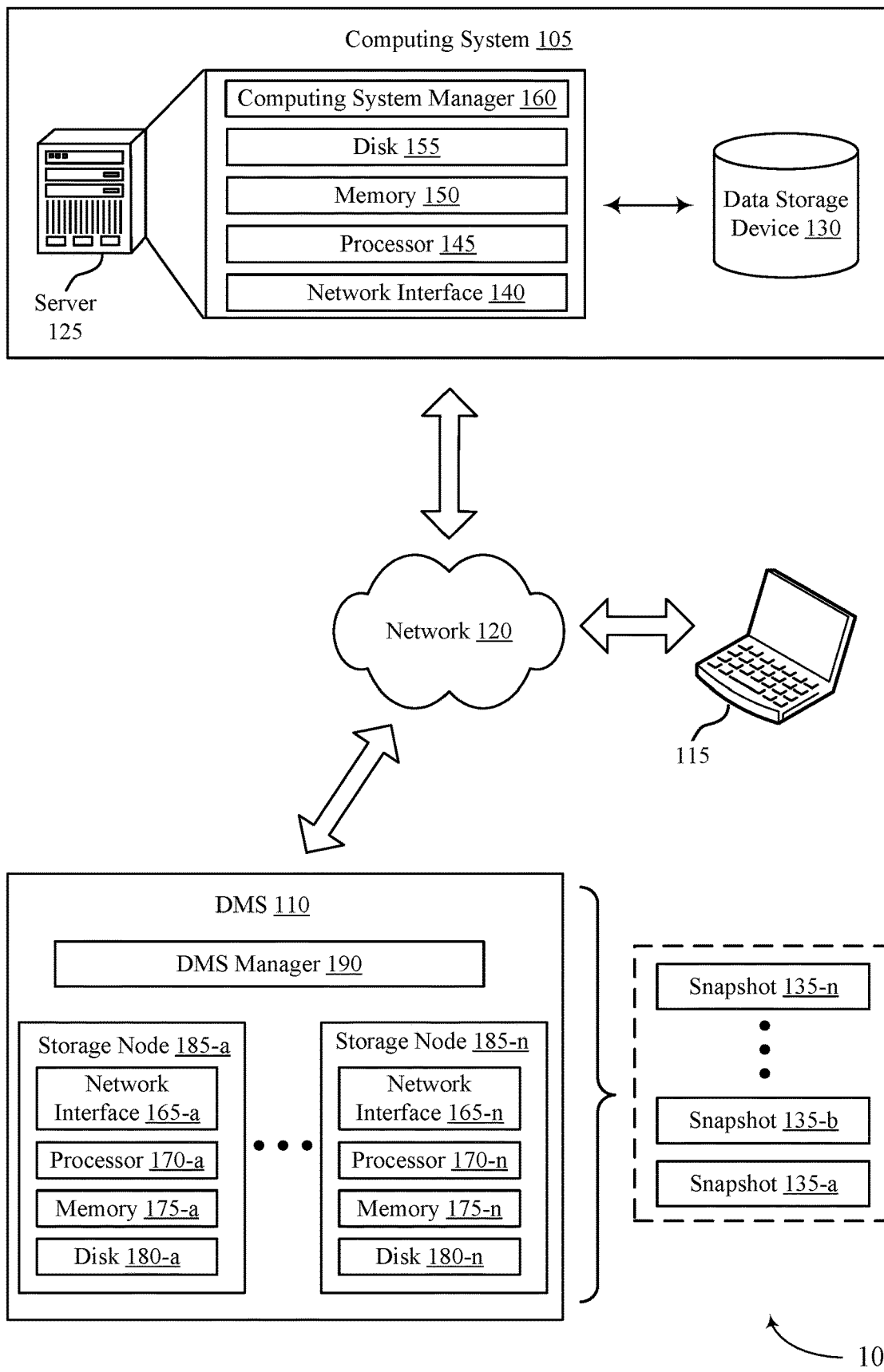
FIGS. 1 and 2 illustrate examples of computing environments that support storage tiering for computing system snapshots in accordance with aspects of the present disclosure.

Cloud environments may support the backing up and storage of computing objects (e.g., a virtual machine, a database, a filesystem, a virtual disk, a virtual desktop, or other type of computing system or storage system) within the cloud environments. For example, cloud environments may support the capturing and storage of snapshots of a computing object, which may be used in recovery (e.g., restoration) of the computing object. In some examples, a cloud environment may support various "tiers" or "types" of storage. For example, a cloud environment may include "primary" cloud storage and "secondary" cloud storage (among other types of storage), where the primary cloud storage is associated with a faster access latency relative to the secondary cloud storage. In some cases, because the information stored in (e.g., backed up to) primary cloud storage may be accessed with reduced latency relative to information stored in secondary cloud storage, service providers of cloud environments may charge customers more for primary cloud storage than secondary cloud storage. That is, a customer of a cloud environment may pay more for a quantity of storage space in primary cloud storage of the cloud environment than a same quantity of storage space in secondary cloud storage of the cloud environment. In some examples, different tiers or types of storage may be included in different cloud environments.

In some examples, customers of cloud environments may benefit from the storage of some snapshots on the cheaper secondary cloud storage instead of the more expensive primary cloud storage. For example, in some industries (e.g., banking, healthcare, among other industries), regulatory requirements may mandate that snapshots be retained for several years, and moving snapshots retained for compliance purposes from primary cloud storage (e.g., Amazon Web Services (AWS) cloud storage, Azure cloud storage, among other examples of primary cloud storage) to secondary cloud storage (e.g., AWS S3-infrequent access (S3-IA), AWS S3-Glacier, Azure Blob, among other types of secondary cloud storage) may be beneficial, because although the secondary cloud storage may have slower access times compared to the primary cloud storage, storing the snapshots in secondary cloud storage may reduce costs associated with storing the snapshots. Additionally or alternatively, some customers may desire to store at least some snapshots in secondary cloud storage that is "air-gapped" relative to their primary cloud storage—e.g., not communicatively coupled or otherwise isolated from the primary cloud environment—so that if the primary cloud storage experiences outages or if an associated cloud account is compromised, the snapshots in the secondary cloud storage may be unaffected and accessed.

Techniques, systems, and devices are described herein to support the orchestration by a data management system (DMS) of storage tiering for snapshots stored at cloud environments (e.g., cloud-native snapshots that are generated and stored at the cloud environment). That is, a DMS may facilitate the movement of snapshots from primary cloud storage of a first cloud environment (within which the cloud-native snapshots are generated) to secondary cloud storage (e.g., of the first cloud environment or a second cloud environment). For example, the DMS may orchestrate the generation of snapshots of a computing object within the first cloud environment, the transfer of such snapshots to the secondary cloud storage, and the deletion of transferred snapshots from the primary cloud storage, the secondary cloud storage, or both. The DMS may cause the storage of snapshots to the secondary cloud storage in accordance with an archival threshold associated with the snapshots. For example, after a snapshot has been stored in the primary cloud storage for a duration of time that satisfies (e.g., is or is greater than) the archival threshold, the DMS may cause the transfer of the snapshot to the secondary cloud storage.

Further, the DMS may orchestrate the conversion of a snapshot from a first format used by the primary cloud storage to a more compressed format (e.g., a sparse file, such as a patch file), such that the snapshot may be stored in the more compressed format within the secondary cloud storage. Additionally or alternatively, the DMS may orchestrate the storage tiering of incremental snapshots, such that updated data blocks associated with the incremental snapshot may be stored to the secondary cloud storage while non-updated data blocks may not be stored to the secondary cloud storage. In some examples, the DMS may orchestrate such storage tiering by creating and using (e.g., by transmitting signaling to) transient (e.g., temporary) computing instances, for example, within the first cloud environment or another cloud environment, to perform the storage tiering.

By facilitating the storage tiering for snapshots, the DMS may improve cloud storage management, increase efficient utilization of computing resources and storage resources, and improve user experience related to reduced storage costs, among other benefits. For example, by managing the storage of snapshots from primary cloud storage to secondary cloud storage and the deletion of the snapshots from the primary cloud storage, primary cloud storage usage may be reduced, thereby reducing storage costs while supporting the maintenance and recovery of the snapshots. Additionally, by storing snapshots in a compressed format, storing updated data blocks while refraining from storing non-updated data blocks, or a combination thereof, secondary cloud storage usage may be reduced, thereby further reducing storage costs.

Aspects of the disclosure are initially described in the context computing environments. Aspects of the disclosure are additionally described in the context of a storage diagram and a process flow. Aspects of the disclosure are further illustrated by and described with reference to apparatus diagrams, system diagrams, and flowcharts that relate to storage tiering for computing system snapshots.

FIG. 1 illustrates an example of a computing environment 100 that supports storage tiering for computing system snapshots in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In some examples, the computing system 105 may be an example of a cloud environment that supports various types of cloud storage. For example, the cloud environment may include one or more data storage devices 130 that include or support a tiered storage infrastructure. The tiered storage infrastructure may include various types of cloud storage, such as primary cloud storage and secondary cloud storage, among other types of cloud storage. Each type of cloud storage may be associated with different costs, performances, latencies, etc. For example, the primary cloud storage may be associated with higher performance (e.g., reduced access latency) relative to the secondary cloud storage. As a result, service providers of the cloud environment may charge customers (e.g., users of the cloud environment) more for the primary cloud storage than the secondary cloud storage. Though one computing system 105 is shown in the example of FIG. 1, in some examples, the computing environment 100 may include multiple computing systems 105, and each of the multiple computing systems 105 may include (e.g., provide) a different cloud environment, with one or more respective types of cloud storage within the different cloud environments.

In accordance with examples described herein, the DMS 110 may facilitate the storage tiering of cloud native snapshots stored at one or more cloud environments. For example, the DMS 110 may transmit signaling (e.g., a snapshot request) to the computing system 105 (e.g., the computing system manager 160) that instructs the computing system 105 to capture a snapshot 135 of a target computing object of the computing system 105. The signaling may further instruct the computing system 105 to store the snapshot 135 to primary cloud storage, for example, without transferring the snapshot 135 to the DMS 110 for storage. The DMS 110 may monitor (e.g., track) a storage duration of the snapshot 135 in the primary cloud storage, for example, to determine when the snapshot 135 has been stored in the primary cloud storage for a duration of time that satisfies (e.g., is or is greater than) an archival threshold. Based on the snapshot 135 being stored in the primary cloud storage for the duration of time, the DMS 110 may transmit signaling (e.g., to the computing system 105, to another cloud environment) that causes the snapshot 135 to be stored to secondary cloud storage (e.g., of the computing system 105, of another cloud environment). In some examples, the DMS 110 may further transmit signaling that instructs the computing system 105 to delete the snapshot 135 from the primary cloud storage.

Figure 2:
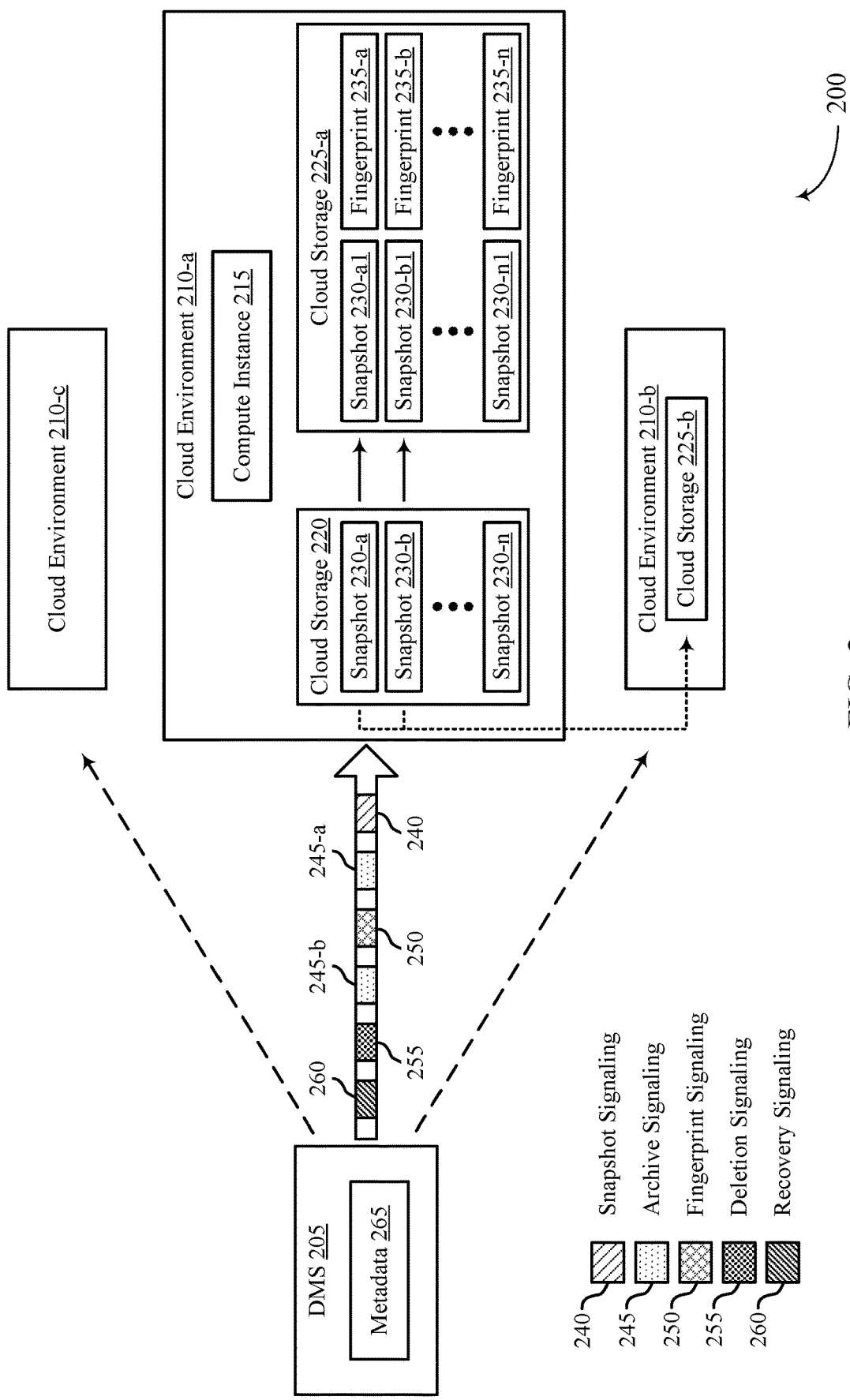

FIG. 2 illustrates an example of a computing environment 200 that supports storage tiering for computing system snapshots in accordance with aspects of the present disclosure. The computing environment 200 may implemented or by implemented by aspects of the computing environment 100 described with reference to FIG. 1. For example, the computing environment 200 may include a DMS 205, which may be an example of a DMS 110 described herein, including with reference to FIG. 1. The computing environment 200 may also include one or more cloud environments 210 (e.g., a cloud environment 210-*a*, a cloud environment 210-*b*, a cloud environment 210-*c*), which may be examples of one or more aspects of a computing system 105 described herein, including with reference to FIG. 1.

The computing environment 200 may support communications between the DMS 205 and the cloud environments 210. For example, the DMS 205 may communicate with the cloud environments 210 via a network, such as a network 120 described with reference to FIG. 1.

The cloud environments 210 may support the capture and storage of snapshots 230 (e.g., snapshots 135) of computing objects within the cloud environments. For example, the cloud environment 210-*a* may capture and store snapshots 230 to cloud storage included in the cloud environment 210-*a*. The cloud environment 210-*a* may support various types of cloud storage for storing snapshots 230. For example, the cloud environment 210-*a* may include cloud storage 220. In some examples, the cloud environment 210-*a* may also include cloud storage 225-*a*. The cloud storage 220 may be a first type of cloud storage corresponding to primary cloud storage, and the cloud storage 225-*a* may be a second type of cloud storage corresponding to secondary cloud storage. The cloud storage 225-*a* may be associated with a slower access latency than the cloud storage 220 but may also be associated with a reduced storage cost relative to the cloud storage 220.

In some examples, the cloud environment 210-*a* may capture and store snapshots 230 based on instructions received from the DMS 205. For example, the DMS 205 may transmit snapshot signaling 240 (e.g., a snapshot request) to the cloud environment 210-*a* that instructs the cloud environment 210-*a* to capture a snapshot 230 of a target computing object and to store the snapshot to the cloud storage 220 (e.g., to primary cloud storage). In some examples, the DMS 205 may transmit the snapshot signaling 240 in accordance with a frequency associated with capturing and storing snapshots 230. For example, a service level agreement (SLA) associated with the DMS 205 and the cloud environment 210-*a* (e.g., a set of one or more configuration parameters according to which the DMS 205 operates with respect to the cloud environment 210-*a*) may indicate a frequency at which the DMS 205 is to instruct the cloud environment 210-*a* to capture and store snapshots 230 to the cloud storage 220. In some examples, the SLA may be between the DMS 205 and a user (e.g., customer) of the cloud environment 210-*a* that uses the cloud environment 210-*a* for storage of the target computing object.

In the example of FIG. 2, the DMS 205 may transmit snapshot signaling 240 that instructs the cloud environment 210-*a* to capture a snapshot 230-*a* of the target computing object and to store the snapshot 230-*a* to the cloud storage 220. The DMS 205 may subsequently transmit additional snapshot signaling 240 (e.g., in accordance with the frequency indicated by the SLA) that instructs the cloud environment 210-*a* to capture additional snapshots 230 (e.g., a snapshot 230-*b* through a snapshot 230-*n*).

The DMS 205 may support the storage tiering of the snapshots 230 stored in the cloud storage 220. For example, the DMS 205 may facilitate the storage of snapshots 230 to cloud storage 225 (e.g., secondary cloud storage) such that usage of the cloud storage 220 (e.g., primary cloud storage usage) may be reduced, thereby reducing costs associated with storing the snapshots 230, among other benefits. For instance, the DMS 205 may track a respective duration of time that each snapshot 230 has been stored in the cloud storage 220. In some examples, the DMS 205 may generate and store metadata 265 to support such duration tracking. For example, the DMS 205 may generate metadata 265 associated with the snapshot 230-*a* that indicates a time at which the snapshot 230-*a* was captured by the cloud environment 210-*a* (e.g., a time at which the DMS 205 transmitted snapshot signaling 240 to instruct the cloud environment to capture the snapshot 230-*a*). The DMS 205 may generate respective metadata 265 for each of the snapshots 230 captured and stored to the cloud storage 220.

Duration tracking of the snapshots 230 in the cloud storage 220 may support the storage tiering of the snapshots 230. For example, the DMS 205 may orchestrate (e.g., cause, facilitate) the storage of the snapshots 230 from the cloud storage 220 to cloud storage 225 in accordance with an archival threshold. The archival threshold may correspond to a duration of time after which snapshots 230 are to be stored to cloud storage 225. That is, after a snapshot 230 has been stored in the cloud storage 220 for the archival threshold, the DMS 205 should cause the snapshot 230 to be stored to cloud storage 225. For example, the DMS 205 may determine that the snapshot 230-*a* has been stored in the cloud storage 220 for a duration of time that satisfies (e.g., meets or exceeds) the archival threshold (e.g., based on metadata 265 corresponding to the snapshot 230-*a*). Based on (e.g., in response to) the snapshot 230-*a* being stored in the cloud storage 220 for at least the archival threshold, the DMS 205 may transmit archive signaling 245-*a* that causes the snapshot 230-*a* to be stored to the cloud storage 225. For example, the snapshot 230-*a* being stored in the cloud storage 220 for at least the archival threshold may trigger the DMS 205 to transmit the archive signaling 245-*a*. In some examples, the archival threshold may be configured (e.g., selected) as part of the SLA. In some examples, the archival threshold may be zero. Here, the snapshots 230 may be immediately stored to the cloud storage 225 after capture and storage to the cloud storage 220.

In some examples, the archive signaling 245-*a* may instruct the cloud environment 210-*a* to store the snapshot 230-*a* to the cloud storage 225-*a*. Accordingly, in response to receiving the archive signaling 245-*a*, the cloud environment 210-*a* may read data blocks associated with the snapshot 230-*a* and store (e.g., write) the data blocks as a snapshot 230-*a*1 to the cloud storage 225-*a*. In some examples, the archive signaling 245-*a* may instruct the cloud environment 210-*a* to store the snapshot 230-*a* to cloud storage 225 included in another cloud environment 210. For example, the archive signaling 245-*a* may instruct the cloud environment to store the snapshot 230-*a* to cloud storage 225-*b* included in the cloud environment 210-*b*. Here, the cloud environment 210-*a* may transmit the snapshot 230-*a*1 to the cloud environment 210-*b* for storage in the cloud storage 225-*b*.

In some examples, the archive signaling 245-*a* may instruct the cloud environment 210-*a* to transfer the snapshot 230-*a* to cloud storage 225 (e.g., the cloud storage 225-*a* or the cloud storage 225-*b*). That is, the archive signaling 245-*a* may instruct the cloud environment 210-*a* to store the snapshot 230-*a*1 to the cloud storage 225 and delete the snapshot 230-*a* from the cloud storage 220. In some examples, the snapshot 230-*a* may not be deleted from the cloud storage 220 in response to archive signaling 245-*a*. Here, the DMS 205 may transmit deletion signaling 255 to the cloud environment 210-*a* that instructs the cloud environment 210-*a* to delete the snapshot 230-*a* from the cloud storage 220. The DMS 205 may transmit the deletion signaling concurrent with or at some time transmitting the archive signaling 245-*a* (e.g., after the snapshot 230-*a*1 is stored to the cloud storage 225).

In some examples, the DMS 205 may facilitate the storage of the snapshot 230-*a* to cloud storage 225 by creating a compute instance 215 on the cloud environment 210-*a* or another cloud environment 210 (e.g., the cloud environment 210-*b*, the cloud environment 210-*c*). For example, the compute instance 215 may be a temporary compute instance via which the DMS 205 may cause the storage of snapshots 230 to cloud storage 225. For instance, the archive signaling 245-*a* may cause the compute instance 215 to be created on cloud environment 210-*a* or the other cloud environment 210 (e.g., if transmitted to the other cloud environment 210). The compute instance 215 may perform the storage of the snapshot 230-*a* to the cloud storage 225. For example, the compute instance 215 may read data blocks of the snapshot 230-*a* and store the snapshot 230-*a*1 including the read data blocks to the cloud storage 225 (e.g., write the snapshot 230-*a*1 to the cloud storage 225-*a*, transmit the snapshot 230-*a*1 to the cloud storage 225-*b*).

To reduce latency and improve storage efficiency, archive signaling 245 may instruct for the cloud environment 210-*a* (e.g., the compute instance 215 on the cloud environment 210-*a* or another cloud environment 210) to read non-zero data blocks of a snapshot 230 (e.g., data blocks of the snapshot 230 that store data associated with the target computing object) and store the non-zero data blocks to the cloud storage 225, while skipping the reading and storage of zero data blocks of the snapshot 230 (e.g., data blocks of the snapshot 230 that do not store data associated with the target computing object) to the cloud storage 225. In some examples, information indicating which data blocks of the snapshot 230 are non-zero data blocks and which data blocks are zero blocks may be obtained via an application programming interface (API) operating at the cloud environment 210-*a*. By skipping the reading and storage of zero data blocks of a snapshot 230, a storage space occupied by the snapshot 230 in the cloud storage 225 may be reduced. Additionally, a latency associated with storing the snapshot 230 to the cloud storage 225 may be reduced, for example, due to the reading and writing of fewer data blocks.

To further reduce latency of storing snapshots 230 to cloud storage 225, archive signaling 245 may instruct for data blocks of a snapshot 230 (e.g., the non-zero data blocks) to be read in parallel. That is, the data blocks of the snapshot 230 may be concurrently (e.g., simultaneously) read. In some examples, the data blocks may be read via the API operating at the cloud environment 210-*a*. In some examples, the data blocks may be read from a disk (e.g., a disk 155) launched from the snapshot 230.

To reduce a storage space occupied by snapshots 230 stored to cloud storage 225, archive signaling 245 may instruct for snapshots 230 to be stored to cloud storage 225 in a different type of file format than a file format used to store the snapshots 230 to cloud storage 220. For example, the snapshot 230-*a* may be stored to the cloud storage 220 in accordance with a first type file format. In some examples, the first type file format may correspond to a file format of the target computing object. For example, the snapshot 230-*a* may be a copy (e.g., replica) of the target computing object at a point-in-time at which the snapshot 230-*a* is captured. To reduce a storage space of the cloud storage 225 occupied by the snapshot 230-*a*1, the archive signaling 245-*a* may instruct for the snapshot 230-*a*1 to be stored in accordance with a patch file format. For example, when storing a snapshot 230 in accordance with a patch file format, non-zero data blocks may be read and stored and the addition of zero blocks, for example, to align data block indexes, may be skipped. Instead, offsets may be stored along with the non-zero data blocks (e.g., as a two-level index key value store, where the keys are offsets and the values are data blocks) such that the snapshot 230 may be properly restored while reducing a quantity of stored data blocks.

Additionally or alternatively, archive signaling 245 may instruct for data blocks of a snapshot 230 to be compressed before being written to the cloud storage 225. For example, non-zero data blocks written to a patch file corresponding to the snapshot 230-*a*1 may be compressed and then written to the patch file for storage in the cloud storage 225 to further reduce a storage space occupied by the snapshot 230-*a*1. Accordingly, the snapshot 230-*a*1 may include compressed data blocks of the snapshot 230-*a*.

The DMS 205 may support the storage of snapshots 230 to the cloud storage 225 as incremental snapshots. For example, the snapshot 230-*b* may correspond to snapshot 230 of the target computing object that is captured at a point-in-time after the snapshot 230-*a* is captured. Accordingly, one or more data blocks captured in the snapshot 230-*b* may be data blocks associated with the target computing object that were updated relative to data blocks of the snapshot 230-*a*. The DMS 205 may determine when the snapshot 230-*b* has been stored in the cloud storage 220 for at least the archival threshold (e.g., based on corresponding metadata 265) and may transmit archive signaling 245-*b* that instructs the cloud environment 210-*a* (e.g., the compute instance 215 on the cloud environment 210-*a* or the other cloud environment 210) to store the snapshot 230-*b* to the cloud storage 225, for example, as a snapshot 230-*b*1.

To reduce a storage space of the cloud storage 225 occupied by the snapshot 230-*b*1, the archive signaling 245-*b* may instruct for the one or more updated data blocks to be stored to the cloud storage 225 and for the non-updated data blocks (e.g., data blocks of the snapshot 230-*a* and the snapshot 230-*b* that are the same) to not be stored to the cloud storage 225 (e.g., skipped). The cloud environment 210-*a* (e.g., the compute instance 215) may determine which data blocks of the snapshot 230-*b* were updated relative to the snapshots 230-*a* according to various techniques. In some examples, if the snapshot 230-*a* is still stored in the cloud storage 220 at the time that the archive signaling 245-*b* instructs for the snapshot 230-*b* to be stored the cloud storage 225, the cloud environment 210-*a* may compare the snapshot 230-*a* and the snapshot 230-*b* (e.g., using the API) to determine which data blocks were updated. That is, if the snapshot 230-*a* and the snapshot 230-*b* are concurrently stored in the cloud storage 220 (e.g., if the snapshot 230-*a* has not yet been deleted from the cloud storage 220), the cloud environment 210-*a* may compare data blocks of the snapshot 230-*b* to corresponding data blocks of the snapshot 230-*a* and determine the updated data blocks to be the data blocks of the snapshot 230-*b* that are different from the corresponding data blocks of the snapshot 230-*a*.

Alternatively, the cloud environment 210-*a* (e.g., the compute instance 215) may compare fingerprints 235 associated with the snapshots 230-*a* and 230-*b* to determine the updated data blocks. For example, a fingerprint 235 may be a fingerprint file that includes a hash value for each data block that is indicative of the data stored in each data block. Accordingly, to determine which data blocks are different between the snapshot 230-*a* and the snapshot 230-*b*, the cloud environment 210-*a* may read a fingerprint 235-*a* that includes hash values for the data blocks of the snapshot 230-*a* and compare the hash values to hash values for the data blocks of the snapshot 230-*b*. Data blocks of the snapshot 230-*b* having different hash values from corresponding data blocks of the snapshot 230-*a* may correspond to the updated data blocks. Additional details related to the comparison of fingerprints 235 to determine updated data blocks are described with reference to FIG. 3 below.

To support the use of fingerprints 235, the DMS 205 may transmit fingerprint signaling 250 that instructs the cloud environment 210-*a* (e.g., the compute instance 215) to create a fingerprint 235 of a snapshot 230 and store the fingerprint 235 to the cloud storage 225 (e.g., in conjunction with the storage of the snapshot 230 to the cloud storage 225). For example, the DMS 205 may transmit fingerprint signaling 250 that instructs for the cloud environment 210-*a* to create the fingerprint 235-*a* corresponding to the snapshot 230-*a* and to store the fingerprint 235-*a* to the cloud storage 225 along with the snapshot 230-*a*1. Similarly, fingerprint signaling 250 may be transmitted to create fingerprints 235-*b* through 235-*n* in conjunction with the storage of snapshots 230-*b* through 230-*n* to the cloud storage 225 (e.g., as snapshots 230-*b*1 through 230-*n*1). In some examples, the fingerprint signaling 250 may be transmitted in conjunction with archive signaling 245. In some examples, the fingerprint signaling 250 may be included in the archive signaling 245 (e.g., or vice versa).

The metadata 265 may facilitate the transmission of archive signaling 245. For example, metadata 265 generated by the DMS 205 may include a storage location of a snapshot 230 in the cloud storage 220, which the DMS 205 may use in transmitting the archive signaling 245. For example, the DMS 205 may determine the storage location of the snapshot 230-*a* in the cloud storage 220 using corresponding metadata 265 and the archive signaling 245-*a* may instruct for the cloud environment 210-*a* (e.g., the compute instance 215) to store the snapshot 230 at the determined storage location (e.g., the snapshot 230-*a*) to the cloud storage 225.

Additionally or alternatively, the metadata 265 may include a storage location of a snapshot 230 within the cloud storage 225, a storage location of a corresponding fingerprint 235 within the cloud storage 225, or a combination thereof. For instance, the archive signaling 245 may include the storage location for the snapshot 230 within the cloud storage 225, and the fingerprint signaling 250 may include the storage location of the corresponding fingerprint within the cloud storage 225. The DMS 205 may generate metadata 265 that includes the storage locations within the cloud storage 225 and store the metadata 265 at the DMS 205. The DMS 205 may use the metadata 265 in transmitting the archive signaling 245 to facilitate the comparison of snapshots 230 to determine updated data blocks in association with storing snapshots 230 to cloud storage 225 as incremental snapshots. For example, the DMS 205 may determine the storage location of the fingerprint 235-*a* in the cloud storage 225 using corresponding metadata 265 and the archive signaling 245-*a* may instruct for the cloud environment 210-*a* (e.g., the compute instance 215) to read the fingerprint 235 at the determined storage location (e.g., the fingerprint 235-*a*) to compare to a fingerprint 235-*b* of the snapshot 230-*b*.

Additionally or alternatively, the DMS 205 may use the metadata 265 to support the recovery of data blocks (e.g., snapshots 230) stored to cloud storage 225. For example, to recover a data block, the DMS 205 may determine a storage location of the data block in the cloud storage 225 (e.g., a patch file in the cloud storage 225 that includes the data block) based on corresponding metadata 265 and transmit recovery signaling 260 to the cloud environment 210-*a* (e.g., the compute instance 215) that instructs the cloud environment 210-*a* (e.g., the compute instance) to read the data block from the storage location in the cloud storage 225. The recovery signaling 260 may further instruct the cloud environment 210-*a* to recover the data block to the first cloud environment 210-*a* (e.g., or another cloud environment 210) in an original format according to which the data block was stored to the cloud storage 220 (e.g., the first type of file format). For example, the cloud environment 210-*a* may read and decompress the data block to obtain the data as stored to the cloud storage 220 and recover the obtained data to a disk of the cloud environment 210-*a* (e.g., a disk 155).

The DMS 205 may also support the full recovery of a snapshot 230 (e.g., recovery of a full snapshot 230 of the target computing object). For example, to recover a full snapshot 230 of the target computing object, the recovery signaling 260 may instruct for information of an incremental snapshot 230 stored to cloud storage 225 to be read and combined with (e.g., applied to) the information of an earlier base snapshot 230 of the computing object (e.g., a snapshot 230-*a*) along with the information of any intervening incremental snapshots 230 stored to the cloud storage 225. The data blocks of the read snapshots 230 may be read in parallel and written to a target disk of the cloud environment 210-*a* (e.g., or another cloud environment 210). Additionally, portions of patch files storing the snapshots 230 that include the information to be recovered may be read, for example, without reading or downloading entire patch files to reduce a latency associated with the recovery of the full snapshot 230.

The DMS 205 may support the deletion of snapshots 230 from the cloud storage 225. For example, the DMS 205 may delete snapshots 230 from the cloud storage 225 (e.g., and/or the cloud storage 220) in accordance with a retention duration. For instance, the retention duration may correspond to a duration of time that a snapshot 230 is to be stored after its capture and storage to the cloud storage 220. In some examples, the retention duration may be configured (e.g., selected) as part of the SLA. The DMS 205 may determine which snapshots 230 have expired and transmit deletion signaling 255 (e.g., to the cloud environment 210-*a* or the cloud environment 210-*b*) to delete the snapshots 230 from cloud storage (e.g., cloud storage 225 or cloud storage 220). For example, an expired snapshot 230 may correspond to a snapshot 230 that has been stored in cloud storage for at least the retention duration. Based on the snapshot 230 expiring, the DMS 205 may determine a storage location of the expired snapshot 230 and transmit deletion signaling 255 that causes the expired snapshot 230 to be deleted. For example, the DMS 205 may determine that the snapshot 230-*a* is expired (e.g., based on corresponding metadata 265). The DMS 205 may determine a storage location of the snapshot 230-*a*, for example, in the cloud storage 220, the cloud storage 225, or both, and transmit deletion signaling 255 that instructs the cloud environment 210-*a* (e.g., the compute instance 215) or the cloud environment 210-*b*, or both, to delete the snapshot 230-*a* (e.g., the snapshot 230-*a*1). In some examples, the deletion signaling 255 may also instruct the cloud environment 210-*a* (e.g., the compute instance 215) or the cloud environment 210-*b*, or both, to delete the corresponding fingerprint 235 (e.g., the fingerprint 235-*a*) from the cloud storage 225.

Figure 3:
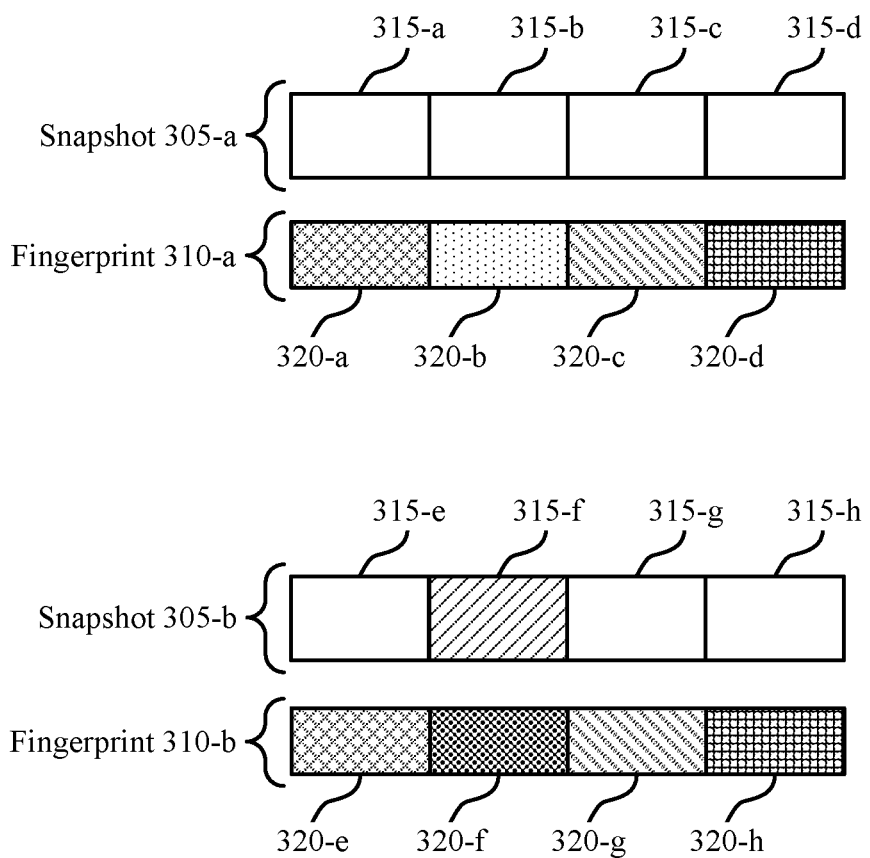
FIG. 3 illustrates an example of a storage diagram that supports storage tiering for computing system snapshots in accordance with aspects of the present disclosure.

FIG. 3 illustrates an example of a storage diagram 300 that supports storage tiering for computing system snapshots in accordance with aspects of the present disclosure. The storage diagram 300 may be implemented by aspects of the computing environments 100 and 200 as described with reference to FIGS. 1 and 2, respectively. For example, the storage diagram 300 may be implemented by a cloud environment (e.g., a compute instance), which may be examples of the corresponding aspects described herein, including with reference to FIGS. 1 and 2. The cloud environment (e.g., the compute instance) may implement the storage diagram 300 to support the determination of updated data blocks for storage to secondary cloud storage.

The storage diagram 300 may include a snapshot 305-*a* and a snapshot 305-*b*, which may each correspond to point-in-time snapshots of a target computing object. The snapshot 305-*b* may correspond to a point-in-time snapshot of the target computing object that is captured after (e.g., subsequent to) the snapshot 305-*a* is captured. Accordingly, one or more data blocks 315 of the snapshot 305-*b* may correspond to data blocks of the target computing object that were updated (e.g., changed) since the snapshot 305-*a* was captured. For example, the snapshot 305-*a* may include data blocks 315-*a*, 315-*b*, 315-*c*, and 315-*d*, and the snapshot 305-*b* may include data blocks 315-*e*, 315-*f*, 315-*g*, and 315-*h* that each correspond to the data blocks 315-*a*, 315-*b*, 315-*c*, and 315-*d*, respectively. In the example of FIG. 3, the data block 315-*f* may be different from the data block 315-*b* (e.g., store data different from the data block 315-*b*), while the data blocks 315-*e*, 315-*g*, and 315-*h* may be the same as (e.g., store the same data as) the data blocks 315-*a*, 315-*c*, and 315-*d*, respectively. Thus, the data block 315-*f* may correspond to an updated data block of the snapshot 305-*b* relative to the snapshot 305-*a*, while the data blocks 315-*e*, 315-*g*, and 315-*h* may correspond to non-updated data blocks of the snapshot 305-*b* relative to the snapshot 305-*a*.

When storing the snapshot 305-*b* to secondary cloud storage, the cloud environment may be configured (e.g., instructed by a DMS) to store the updated data blocks 315 to secondary cloud storage and refrain from storing non-updated data blocks 315 to secondary cloud storage, for example, to reduce storage redundancy and usage. To determine which data blocks 315 are the updated data blocks, the cloud environment may be instructed to compare fingerprints 310 associated with the snapshots 305. For example, the cloud environment may read (e.g., download) a fingerprint 310-a corresponding to the snapshot 305-a. The fingerprint 310-a may include hash values 320 for each of the data blocks 315 of the snapshot 305-a. For example, the fingerprint 310-a may include hash values 320-a, 320-b, 320-c, and 320-d corresponding to data blocks 315-a, 315-b, 315-c, and 315-d, respectively. The hash values 320 may be computed based on the data stored within the corresponding data blocks 315. For example, the cloud environment may compute the hash value 320-a based on the data stored in the data block 315-a, the hash value 320-b based on the data stored in the data block 315-b, and so on.

Additionally, the cloud environment may compute a fingerprint 310-b corresponding to the snapshot 305-b that includes hash values 320 for each of the data blocks 315 of the snapshot 305-b. For example, the fingerprint 310-a may include hash values 320-e, 320-f, 320-g, and 320-h corresponding to data blocks 315-e, 315-f, 315-g, and 315-h, respectively. The cloud environment may compute the hash value 320-e based on the data stored in the data block 315-e, the hash value 320-f based on the data stored in the data block 315-f, and so on.

Based on being computed using the data of a corresponding data block 315, each hash value 320 may be indicative of the data stored in the corresponding data block 315. Thus, two hash values 320 being the same may indicate that the data stored in the corresponding data blocks 315 is the same data, while two hash values 320 being different may indicate that the data stored in the corresponding data blocks 315 is different data. Accordingly, the cloud environment may compare the hash values 320 of corresponding data blocks 315 to determine whether the data blocks 315 are different, thereby indicating that the data block 315 has been updated. For example, the cloud environment may compare the hash value 320-a to the hash value 320-e, the hash value 320-b to the hash value 320-f, and so on. In the example of FIG. 3, based on the comparison, the cloud environment may determine that the hash values 320-a and 320-e are the same, the hash values 320-b and 320-f are different, the hash values 320-c and 320-g are the same, and the hash values 320-d and 320-h are the same.

Accordingly, the cloud environment may determine that the data blocks 315-b and 315-f are different, while the other corresponding data blocks 315 are the same. As a result, the cloud environment may determine that the data block 315-f is an updated data block 315, while the data blocks 315-e, 315-g, and 315-h are non-updated data blocks and may store the data block 315-f to secondary cloud storage while refraining from storing the data blocks 315-e, 315-g, and 315-h to secondary cloud storage. The cloud environment may store the fingerprint 310-b (e.g., including each of the hash values 320-e 320-f, 320-g, and 320-h) to the secondary cloud storage along with storing the data block 315-f, for example, to support the determination of updated data blocks for a next snapshot 305 for which the cloud environment is instructed to store to secondary cloud storage.

Figure 4:
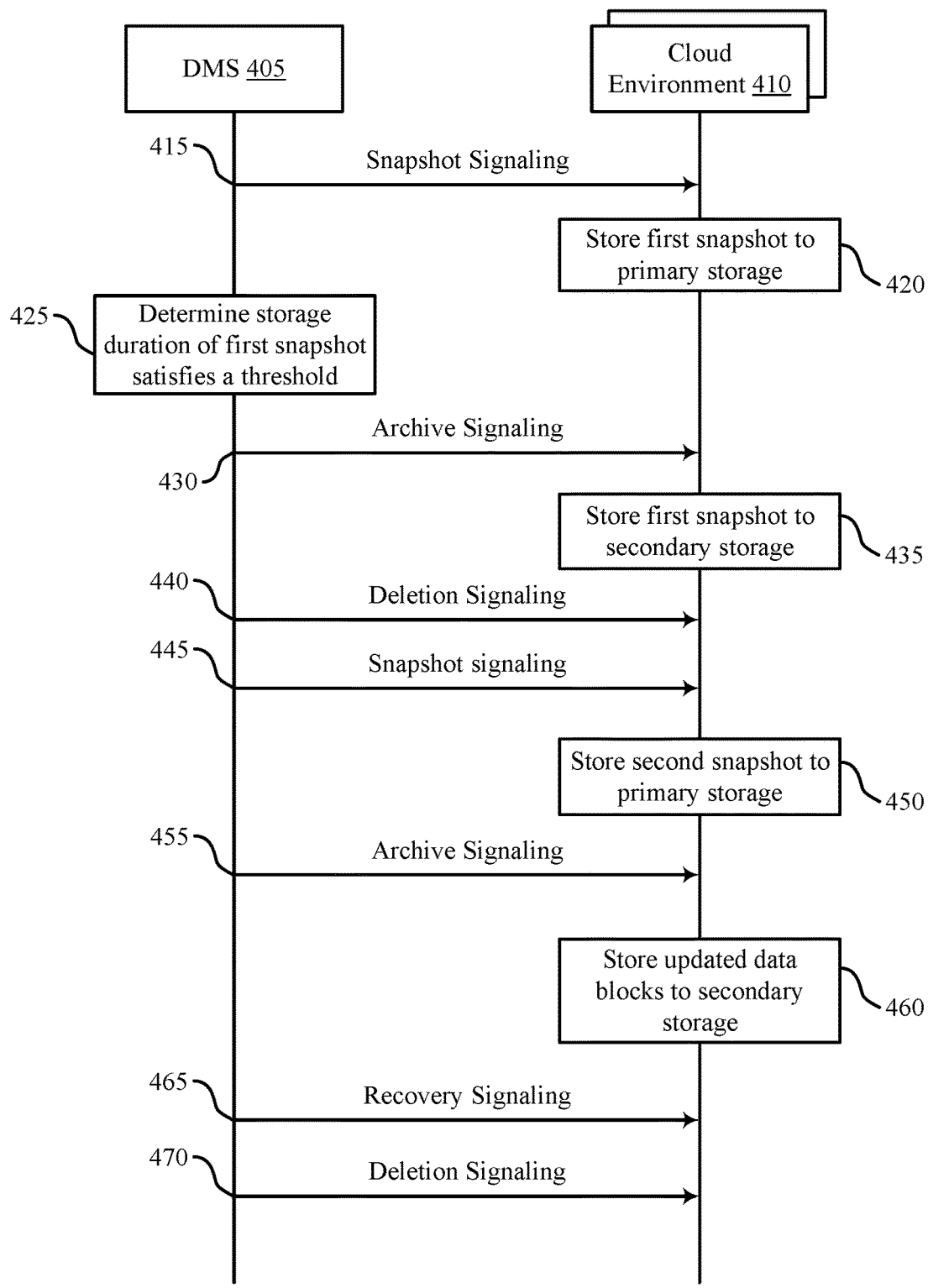
FIG. 4 illustrates an example of a process flow that supports storage tiering for computing system snapshots in accordance with aspects of the present disclosure.

FIG. 4 illustrates an example of a process flow 400 that supports storage tiering for computing system snapshots in accordance with aspects of the present disclosure. The process flow 400 may implement or be implemented by aspects of the computing environments described with reference to FIGS. 1 and 2. For example, the process flow 400 may be implemented by a DMS 405 and one or more cloud environments 410 to support the tiering of cloud native snapshots to secondary cloud storage.

The DMS 405 may be an example of a DMS as described with reference to FIGS. 1 through 3. The cloud environment 410 may be an example of a cloud environment or a computing system 105 as described with reference to FIGS. 1 through 3. In the following description of the process flow 400, the operations between the DMS 405 and the cloud environment 410 may be communicated in a different order than the example order shown, or the operations performed by the DMS 405 and the cloud environment 410 may be performed in different orders or at different times. Some operations may also be omitted from the process flow 400, and other operations may be added to the process flow 400. Further, although some operations or signaling may be shown to occur at different times for discussion purposes, these operations may actually occur at the same time.

At 415, the DMS 405 may transmit snapshot signaling to a first cloud environment 410 that instructs the first cloud environment to capture a first snapshot of a target computing object within the cloud environment 410.

At 420, the first cloud environment 410 may capture the first snapshot in response to snapshot signaling and store the first snapshot to primary storage included within the cloud environment 410. In some examples, the first cloud environment 410 may store the first snapshot in accordance with a first type of file format, such as a file format corresponding to the file format of the target computing object.

At 425, the DMS 405 may determine that a storage duration of the first snapshot in the primary cloud storage satisfies an archival threshold. For example, the DMS 425 may generate and store metadata that indicates a time at which the first snapshot was captured by the first cloud environment 410. The DMS 425 may use the metadata to track how long the first snapshot is stored in the primary cloud storage. The archival threshold may indicate a duration of time after which snapshots stored in the primary cloud storage are to be stored to secondary cloud storage.

At 430, the DMS 405 may transmit archive signaling to the first cloud environment 410 (e.g., or a second cloud environment 410) that instructs the first cloud environment 410 (e.g., or the second cloud environment 410) to store the first snapshot to secondary cloud storage. For example, in response to the first snapshot being stored in the primary cloud storage for at least the archival threshold, the DMS 405 may transmit the archive signaling.

At 435, the first snapshot may be stored to secondary cloud storage. In some examples, the first cloud environment 410 (e.g., or the second cloud environment 410) may store the first snapshot to secondary cloud storage. In some examples, the archive signaling may cause a temporary compute instance to be created on the first cloud environment 410 (e.g., or the second cloud environment 410) that performs the storage of the first snapshot to the secondary cloud storage. In some examples, the secondary cloud storage may be included within the cloud environment 410. In some other examples, the secondary cloud storage may be included within another cloud environment 410 (e.g., the second cloud environment 410, a third cloud environment 410). In some examples, the archive signaling may instruct for the first snapshot to be stored to the secondary cloud storage in accordance with a second type of file format, such as a patch file format.

At 440, the DMS 405 may transmit deletion signaling that instructs for the first cloud environment 410 to delete the first snapshot from the primary cloud storage. In response, the first cloud environment 410 may delete the first snapshot from the primary cloud storage.

At 445, the DMS 405 may transmit additional snapshot signaling to the first cloud environment 410. The snapshot signaling may instruct the first cloud environment 410 to capture a second snapshot of the target computing object and to store the second snapshot to the primary cloud storage.

At 450, the first cloud environment 410 may capture and store the second snapshot to the primary cloud storage in response to the snapshot signaling (e.g., in accordance with the first type of file format).

At 455, the DMS 405 may transmit additional archive signaling, for example, based on the second snapshot being stored in the primary cloud storage for at least the archival threshold. The archive signaling may instruct for the first cloud environment 410 (e.g., the second cloud environment 410, the compute instance) to store the second snapshot to the secondary cloud storage.

At 460, the first cloud environment 410 (e.g., the second cloud environment 410, the compute instance) may store updated data blocks of the second snapshot to the secondary cloud storage. For example, the archive signaling may instruct for the first cloud environment 410 (e.g., the second cloud environment 410, the compute instance) to determine which data blocks of the second snapshot were updated relative to the first snapshot and to store the updated data blocks to the secondary cloud storage (e.g., while refraining to store the non-updated data blocks).

At 465, the DMS 405 may transmit recovery signaling to the first cloud environment 410 (e.g., the second cloud environment 410, the compute instance) that instructs the first cloud environment 410 (e.g., the second cloud environment 410, the compute instance) to read one or more data blocks from corresponding storage locations in the secondary cloud storage and recover the one or more data blocks to the first cloud environment 410 (e.g., the second cloud environment 410, another cloud environment 410)) in the first type of file format.

At 470, the DMS 405 may transmit deletion signaling to the first cloud environment 410 (e.g., the second cloud environment 410, the compute instance) that instructs the first cloud environment 410 (e.g., the second cloud environment 410, the compute instance) to delete one or more snapshots (e.g., the first snapshot, the second snapshot) from the secondary cloud storage. For example, the first snapshot or the second snapshot may be expired snapshots in accordance with a retention duration, and the DMS 405 may transmit the deletion signaling in response to determining that the first snapshot or the second snapshot have expired.

Figure 5:
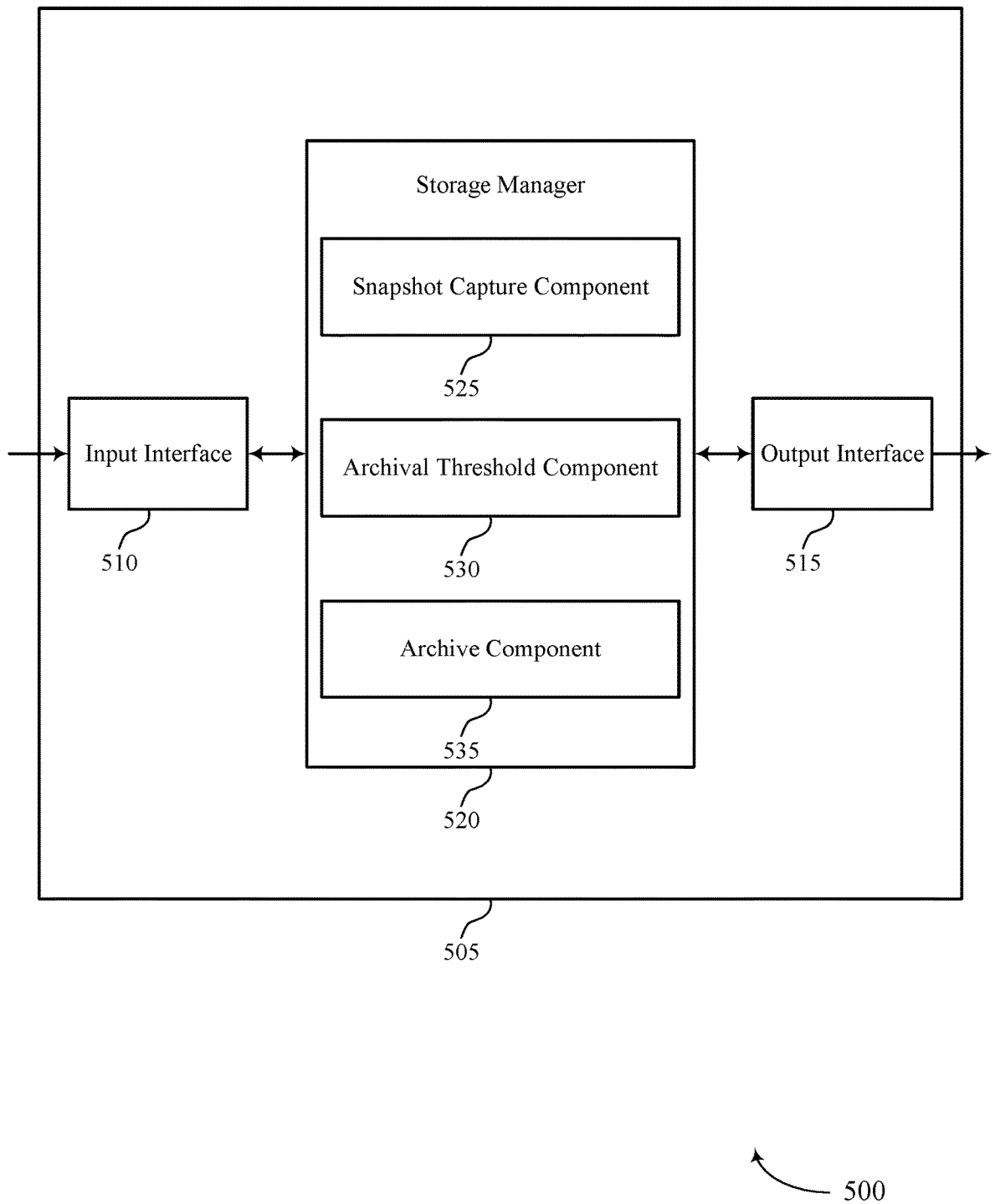
FIG. 5 shows a block diagram of an apparatus that supports storage tiering for computing system snapshots in accordance with aspects of the present disclosure.

FIG. 5 shows a block diagram 500 of a system 505 that supports storage tiering for computing system snapshots in accordance with aspects of the present disclosure. In some examples, the system 505 may be an example of aspects of one or more components described with reference to FIG. 1, such as a DMS 110. The system 505 may include an input interface 510, an output interface 515, and a storage manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the storage manager 520 to support storage tiering for computing system snapshots. In some cases, the input interface 510 may be a component of a network interface 715 as described with reference to FIG. 7.

The output interface 515 may manage output signaling for the system 505. For example, the output interface 515 may receive signaling from other components of the system 505, such as the storage manager 520, and may transmit such output signaling corresponding to (e.g., representative of or otherwise based on) such signaling to other systems or devices. In some cases, the output interface 515 may be a component of a network interface 715 as described with reference to FIG. 7.

The storage manager 520 may include a snapshot capture component 525, an archival threshold component 530, an archive component 535, or any combination thereof. In some examples, the storage manager 520, or various components thereof, may be configured to perform various operations (e.g., receiving, monitoring, transmitting) using or otherwise in cooperation with the input interface 510, the output interface 515, or both. For example, the storage manager 520 may receive information from the input interface 510, send information to the output interface 515, or be integrated in combination with the input interface 510, the output interface 515, or both to receive information, transmit information, or perform various other operations as described herein.

The storage manager 520 may support data management in accordance with examples as disclosed herein. The snapshot capture component 525 may be configured as or otherwise support a means for transmitting, from a DMS to a first cloud environment including a first type of cloud storage, first signaling that instructs the first cloud environment to capture a first snapshot of a computing object within the first cloud environment and to store the first snapshot in the first type of cloud storage. The archival threshold component 530 may be configured as or otherwise support a means for determining, by the DMS, that the first snapshot has been stored in the first type of cloud storage for a duration of time that satisfies a threshold duration of time. The archive component 535 may be configured as or otherwise support a means for transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

Figure 6:
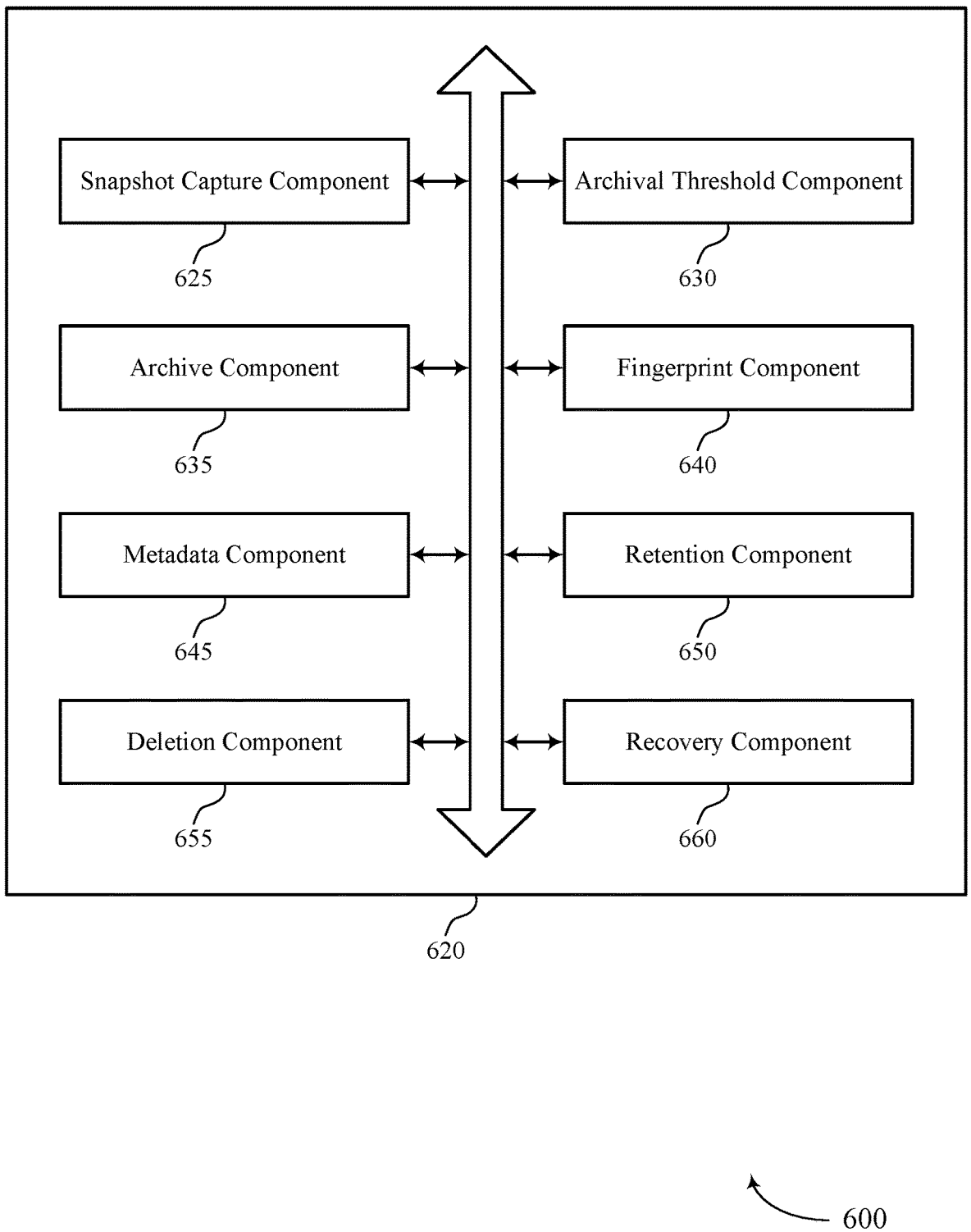
FIG. 6 shows a block diagram of a storage manager that supports storage tiering for computing system snapshots in accordance with aspects of the present disclosure.

FIG. 6 shows a block diagram 600 of a storage manager 620 that supports storage tiering for computing system snapshots in accordance with aspects of the present disclosure. The storage manager 620 may be an example of aspects of a storage manager 520 as described herein. The storage manager 620, or various components thereof, may be an example of means for performing various aspects of storage tiering for computing system snapshots as described herein. For example, the storage manager 620 may include a snapshot capture component 625, an archival threshold component 630, an archive component 635, a fingerprint component 640, a metadata component 645, a retention component 650, a deletion component 655, a recovery component 660, or any combination thereof. Each of these components may communicate, directly or indirectly, with one another (e.g., via one or more buses, communications links, communications interfaces, or any combination thereof).

The storage manager 620 may support data management in accordance with examples as disclosed herein. The snapshot capture component 625 may be configured as or otherwise support a means for transmitting, from a DMS to a first cloud environment including a first type of cloud storage, first signaling that instructs the first cloud environment to capture a first snapshot of a computing object within the first cloud environment and to store the first snapshot in the first type of cloud storage. The archival threshold component 630 may be configured as or otherwise support a means for determining, by the DMS, that the first snapshot has been stored in the first type of cloud storage for a duration of time that satisfies a threshold duration of time. The archive component 635 may be configured as or otherwise support a means for transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

In some examples, the snapshot capture component 625 may be configured as or otherwise support a means for transmitting, from the DMS to the first cloud environment, third signaling that instructs the first cloud environment to capture a second snapshot of the computing object and to store the first snapshot in the first type of cloud storage. In some examples, the archive component 635 may be configured as or otherwise support a means for transmitting, from the DMS and based on the second snapshot being stored in the first type of cloud storage for the duration that satisfies the threshold duration, fourth signaling that instructs the first cloud environment to store the second snapshot to the second type of cloud storage, where the fourth signaling instructs the first cloud environment or a third cloud environment to determine which data blocks of the second snapshot were updated relative to the first snapshot and to store the updated data blocks to the second type of cloud storage.

In some examples, to determine which data blocks of the second snapshot were updated relative to the first snapshot, the fourth signaling may instruct the first cloud environment or the third cloud environment to compare, based on the first snapshot and the second snapshot being concurrently stored in the first type of cloud storage, the data blocks of the second snapshot to corresponding data blocks of the first snapshot, where the updated data blocks include one or more data blocks of the second snapshot that are different from one or more corresponding data blocks of the first snapshot.

In some examples, to determine which data blocks of the second snapshot were updated relative to the first snapshot, the fourth signaling may instruct the first cloud environment or the third cloud environment to: read a first fingerprint file associated with the first snapshot, the first fingerprint file including a respective first hash value for each data block of the first snapshot and compare the first fingerprint file to a second fingerprint file associated with the second snapshot that includes a respective second hash value for each data block of the second snapshot, where the updated data blocks include one or more data blocks of the second snapshot having respective second hash values that are different from respective first hash values of one or more corresponding data blocks of the first snapshot.

In some examples, the fingerprint component 640 may be configured as or otherwise support a means for transmitting, from the DMS, signaling that instructs the first cloud environment to create a fingerprint file associated with the first snapshot that includes a respective hash value for each data block of the first snapshot and to store the fingerprint file to the second type of cloud storage.

In some examples, the metadata component 645 may be configured as or otherwise support a means for generating, by the DMS, metadata associated with the first snapshot that indicates a storage location of the first snapshot within the first type of cloud storage and a first time at which the first snapshot was captured, where determining that the first snapshot has been stored in the first type of cloud storage for the duration that satisfies the threshold duration is based on the metadata.

In some examples, the metadata component 645 may be configured as or otherwise support a means for generating, by the DMS, metadata associated with the first snapshot that indicates a storage location of the first snapshot within the second type of cloud storage, a storage location of a fingerprint file associated with the first snapshot within the second type of cloud storage, or a combination thereof.

In some examples, the second signaling is configured to cause a temporary computing instance to be created on the first cloud environment or a third cloud environment. In some examples, the temporary computing instance is configured to perform the storage of the first snapshot to the second type of cloud storage.

In some examples, the second signaling instructs the first cloud environment to store, to the second type of cloud storage, data blocks of the first snapshot that store data associated with the computing object and to skip storing, to the second type of cloud storage, data blocks of the first snapshot that do not store data associated with the computing object.

In some examples, the retention component 650 may be configured as or otherwise support a means for determining, by the DMS, that a retention duration since the capture of the first snapshot has expired, where the retention duration is greater than the threshold duration. In some examples, the deletion component 655 may be configured as or otherwise support a means for transmitting, from the DMS to the first cloud environment or the second cloud environment and based on the expiration of the retention duration, signaling that instructs the first cloud environment or the second cloud environment to delete the first snapshot from the second type of cloud storage.

In some examples, the recovery component 660 may be configured as or otherwise support a means for determining, based on metadata associated with the first snapshot, a storage location within the second type of cloud storage of a data block of the first snapshot. In some examples, the recovery component 660 may be configured as or otherwise support a means for transmitting, by the DMS, signaling that instructs the first cloud environment or the second cloud environment to read the data block from the storage location and recover the data block to the first cloud environment or a third cloud environment in an original format according to which the data block was stored to the first type of cloud storage.

In some examples, the deletion component 655 may be configured as or otherwise support a means for transmitting, from the DMS, signaling that instructs the first cloud environment to delete the first snapshot from the first type of cloud storage after the first snapshot is stored to the second type of cloud storage.

In some examples, the second signaling instructs the first cloud environment to store the first snapshot to the second type of cloud storage in accordance with a second type of file format that is different than a first type of file format according to which the first snapshot is stored in the first type of cloud storage.

In some examples, the second signaling instructs the first cloud environment to compress data blocks of the first snapshot and to store the compressed data blocks to the second type of cloud storage.

In some examples, the threshold duration is in accordance with an SLA associated with the DMS and the first cloud environment.

Figure 7:
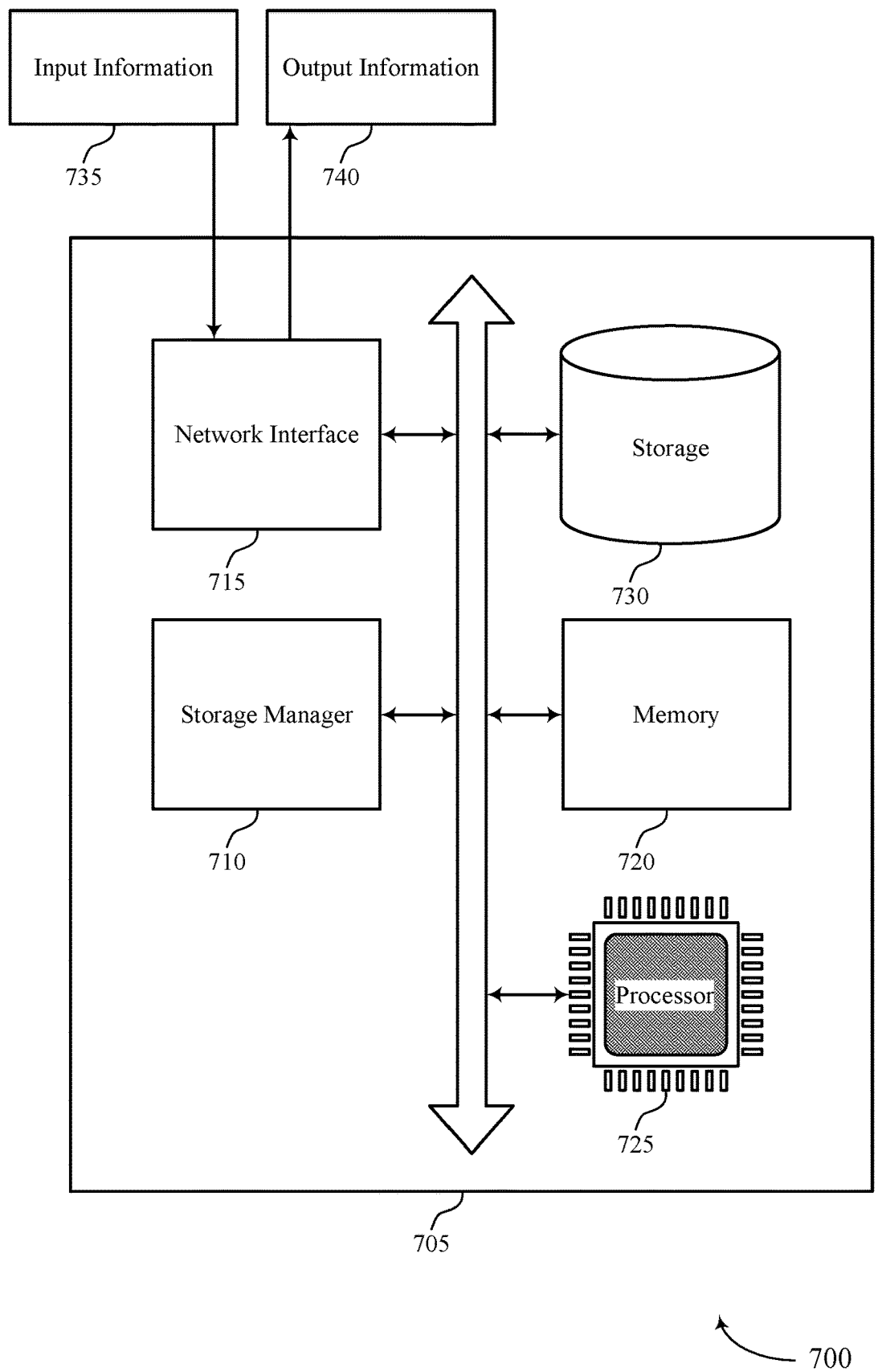
FIG. 7 shows a diagram of a system including a device that supports storage tiering for computing system snapshots in accordance with aspects of the present disclosure.

FIG. 7 shows a diagram of a system 700 including a system 705 that supports storage tiering for computing system snapshots in accordance with aspects of the present disclosure. The system 705 may be an example of or include the components of a system 505 as described herein. The system 705 may include components for data management, including components such as a storage manager 710, a network interface 715, a memory 720, a processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting storage tiering for computing system snapshots). Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The storage manager 710 may support data management in accordance with examples as disclosed herein. For example, the storage manager 710 may be configured as or otherwise support a means for transmitting, from a DMS to a first cloud environment including a first type of cloud storage, first signaling that instructs the first cloud environment to capture a first snapshot of a computing object within the first cloud environment and to store the first snapshot in the first type of cloud storage. The storage manager 710 may be configured as or otherwise support a means for determining, by the DMS, that the first snapshot has been stored in the first type of cloud storage for a duration of time that satisfies a threshold duration of time. The storage manager 710 may be configured as or otherwise support a means for transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

By including or configuring the storage manager 710 in accordance with examples as described herein, the system 705 may support techniques for improved storage management, more efficient utilization of computing resources and storage resources, improved user experience related to reduced storage costs, increased storage flexibility, and improved backup recovery, among other benefits.

Figure 8:
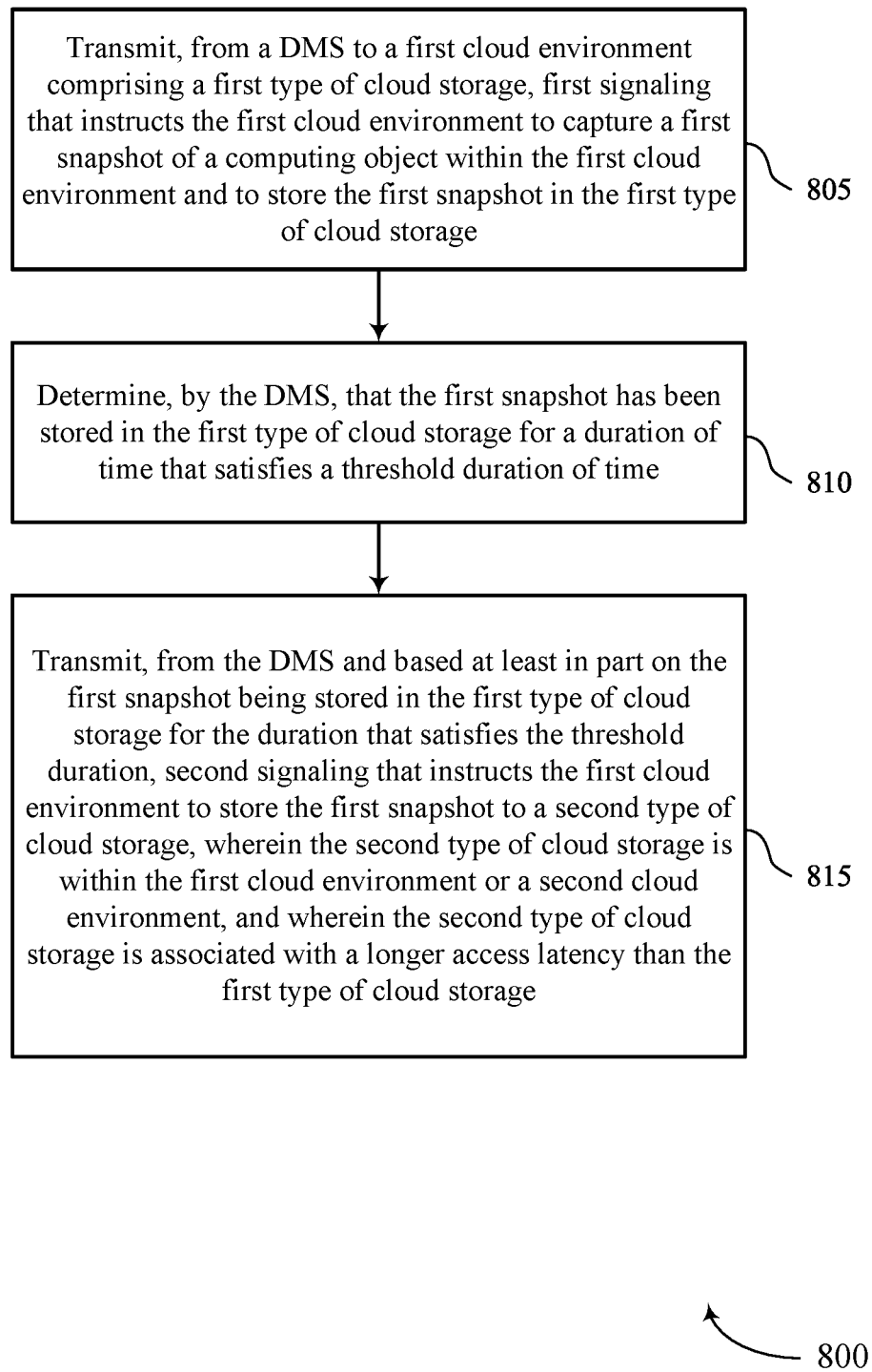
FIGS. 8 through 10 show flowcharts illustrating methods that support storage tiering for computing system snapshots in accordance with aspects of the present disclosure.

FIG. 8 shows a flowchart illustrating a method 800 that supports storage tiering for computing system snapshots in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include transmitting, from a DMS to a first cloud environment including a first type of cloud storage, first signaling that instructs the first cloud environment to capture a first snapshot of a computing object within the first cloud environment and to store the first snapshot in the first type of cloud storage. The operations of 805 may be performed in accordance with examples as disclosed herein. In some examples, aspects of the operations of 805 may be performed by a snapshot capture component 625 as described with reference to FIG. 6.

At 810, the method may include determining, by the DMS, that the first snapshot has been stored in the first type of cloud storage for a duration of time that satisfies a threshold duration of time. The operations of 810 may be performed in accordance with examples as disclosed herein. In some examples, aspects of the operations of 810 may be performed by an archival threshold component 630 as described with reference to FIG. 6.

At 815, the method may include transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage. The operations of 815 may be performed in accordance with examples as disclosed herein. In some examples, aspects of the operations of 815 may be performed by an archive component 635 as described with reference to FIG. 6.

Figure 9:
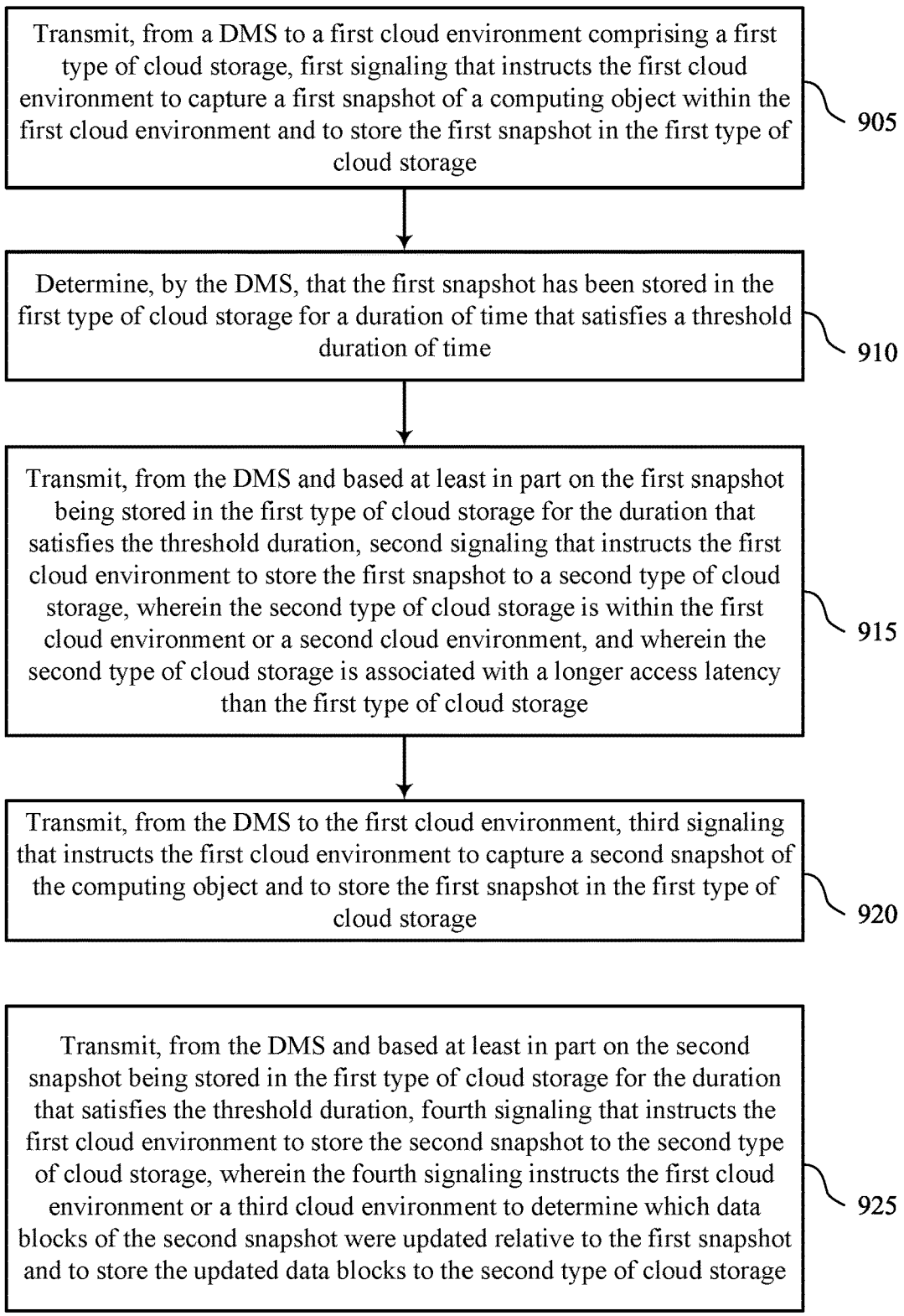

FIG. 9 shows a flowchart illustrating a method 900 that supports storage tiering for computing system snapshots in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include transmitting, from a DMS to a first cloud environment including a first type of cloud storage, first signaling that instructs the first cloud environment to capture a first snapshot of a computing object within the first cloud environment and to store the first snapshot in the first type of cloud storage. The operations of 905 may be performed in accordance with examples as disclosed herein. In some examples, aspects of the operations of 905 may be performed by a snapshot capture component 625 as described with reference to FIG. 6.

At 910, the method may include determining, by the DMS, that the first snapshot has been stored in the first type of cloud storage for a duration of time that satisfies a threshold duration of time. The operations of 910 may be performed in accordance with examples as disclosed herein. In some examples, aspects of the operations of 910 may be performed by an archival threshold component 630 as described with reference to FIG. 6.

At 915, the method may include transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage. The operations of 915 may be performed in accordance with examples as disclosed herein. In some examples, aspects of the operations of 915 may be performed by an archive component 635 as described with reference to FIG. 6.

At 920, the method may include transmitting, from the DMS to the first cloud environment, third signaling that instructs the first cloud environment to capture a second snapshot of the computing object and to store the first snapshot in the first type of cloud storage. The operations of 920 may be performed in accordance with examples as disclosed herein. In some examples, aspects of the operations of 920 may be performed by a snapshot capture component 625 as described with reference to FIG. 6.

At 925, the method may include transmitting, from the DMS and based on the second snapshot being stored in the first type of cloud storage for the duration that satisfies the threshold duration, fourth signaling that instructs the first cloud environment to store the second snapshot to the second type of cloud storage, where the fourth signaling instructs the first cloud environment or a third cloud environment to determine which data blocks of the second snapshot were updated relative to the first snapshot and to store the updated data blocks to the second type of cloud storage. The operations of 925 may be performed in accordance with examples as disclosed herein. In some examples, aspects of the operations of 925 may be performed by an archive component 635 as described with reference to FIG. 6.

Figure 10:
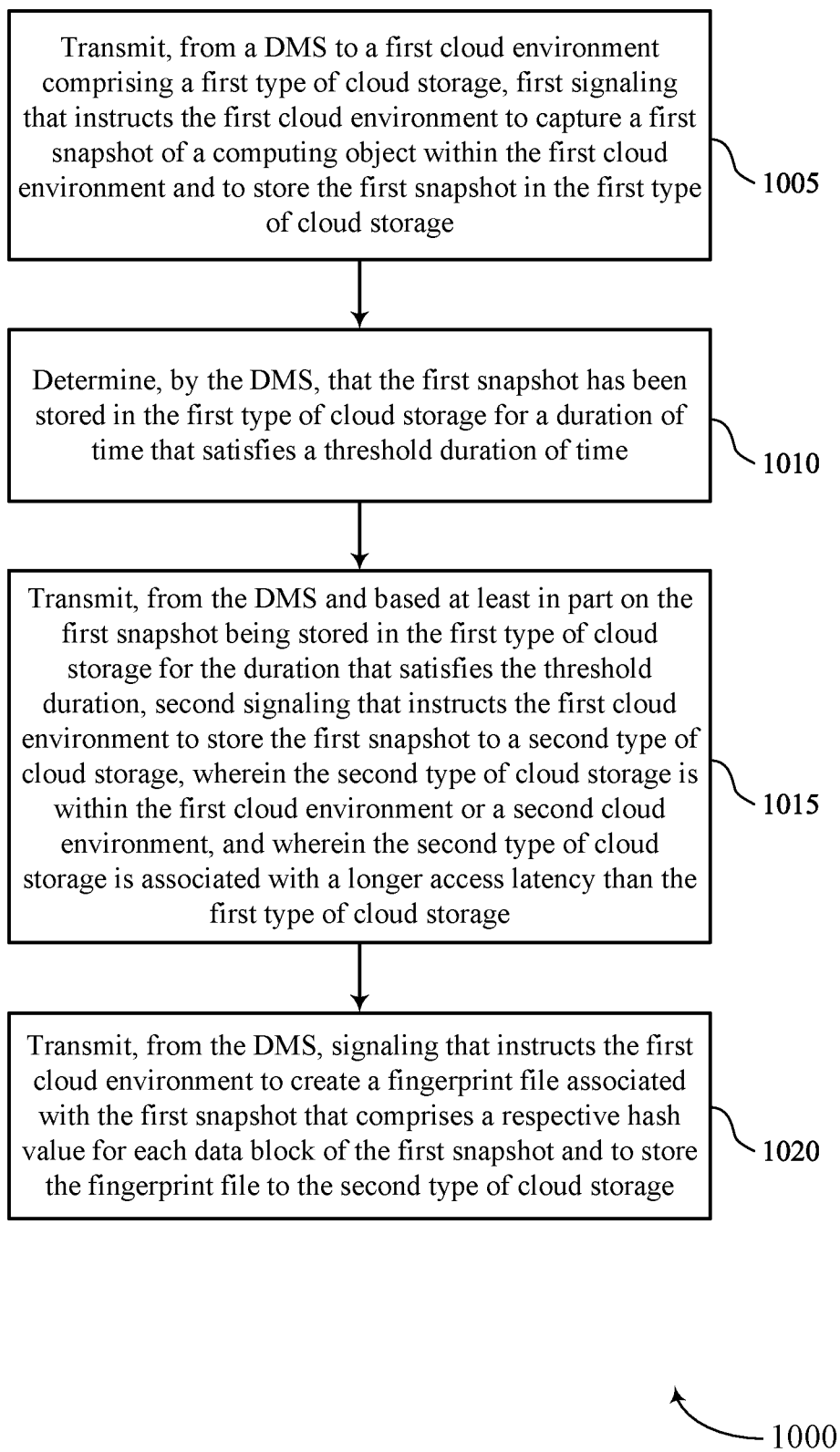

FIG. 10 shows a flowchart illustrating a method 1000 that supports storage tiering for computing system snapshots in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include transmitting, from a DMS to a first cloud environment including a first type of cloud storage, first signaling that instructs the first cloud environment to capture a first snapshot of a computing object within the first cloud environment and to store the first snapshot in the first type of cloud storage. The operations of 1005 may be performed in accordance with examples as disclosed herein. In some examples, aspects of the operations of 1005 may be performed by a snapshot capture component 625 as described with reference to FIG. 6.

At 1010, the method may include determining, by the DMS, that the first snapshot has been stored in the first type of cloud storage for a duration of time that satisfies a threshold duration of time. The operations of 1010 may be performed in accordance with examples as disclosed herein. In some examples, aspects of the operations of 1010 may be performed by an archival threshold component 630 as described with reference to FIG. 6.

At 1015, the method may include transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage. The operations of 1015 may be performed in accordance with examples as disclosed herein. In some examples, aspects of the operations of 1015 may be performed by an archive component 635 as described with reference to FIG. 6.

At 1020, the method may include transmitting, from the DMS, signaling that instructs the first cloud environment to create a fingerprint file associated with the first snapshot that includes a respective hash value for each data block of the first snapshot and to store the fingerprint file to the second type of cloud storage. The operations of 1020 may be performed in accordance with examples as disclosed herein. In some examples, aspects of the operations of 1020 may be performed by a fingerprint component 640 as described with reference to FIG. 6.

A method for data management is described. The method may include transmitting, from a DMS to a first cloud environment including a first type of cloud storage, first signaling that instructs the first cloud environment to capture a first snapshot of a computing object within the first cloud environment and to store the first snapshot in the first type of cloud storage, determining, by the DMS, that the first snapshot has been stored in the first type of cloud storage for a duration of time that satisfies a threshold duration of time, and transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

An apparatus for data management is described. The apparatus may include at least one processor, memory coupled with the at least one processor, and instructions stored in the memory. The instructions may be executable by the at least one processor to cause the apparatus to transmit, from a DMS to a first cloud environment including a first type of cloud storage, first signaling that instructs the first cloud environment to capture a first snapshot of a computing object within the first cloud environment and to store the first snapshot in the first type of cloud storage, determine, by the DMS, that the first snapshot has been stored in the first type of cloud storage for a duration of time that satisfies a threshold duration of time, and transmit, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

Another apparatus for data management is described. The apparatus may include means for transmitting, from a DMS to a first cloud environment including a first type of cloud storage, first signaling that instructs the first cloud environment to capture a first snapshot of a computing object within the first cloud environment and to store the first snapshot in the first type of cloud storage, means for determining, by the DMS, that the first snapshot has been stored in the first type of cloud storage for a duration of time that satisfies a threshold duration of time, and means for transmitting, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

A non-transitory computer-readable medium storing code for data management is described. The code may include instructions executable by at least one processor to transmit, from a DMS to a first cloud environment including a first type of cloud storage, first signaling that instructs the first cloud environment to capture a first snapshot of a computing object within the first cloud environment and to store the first snapshot in the first type of cloud storage, determine, by the DMS, that the first snapshot has been stored in the first type of cloud storage for a duration of time that satisfies a threshold duration of time, and transmit, from the DMS and based on the first snapshot being stored in the first type of cloud storage for the duration that satisfies the threshold duration, second signaling that instructs the first cloud environment to store the first snapshot to a second type of cloud storage, where the second type of cloud storage is within the first cloud environment or a second cloud environment, and where the second type of cloud storage is associated with a longer access latency than the first type of cloud storage.

Some examples of the method, apparatuses, and non-transitory computer-readable medium described herein may further include operations, features, means, or instructions for transmitting, from the DMS to the first cloud environment, third signaling that instructs the first cloud environment to capture a second snapshot of the computing object and to store the first snapshot in the first type of cloud storage and transmitting, from the DMS and based on the second snapshot being stored in the first type of cloud storage for the duration that satisfies the threshold duration, fourth signaling that instructs the first cloud environment to store the second snapshot to the second type of cloud storage, where the fourth signaling instructs the first cloud environment or a third cloud environment to determine which data blocks of the second snapshot were updated relative to the first snapshot and to store the updated data blocks to the second type of cloud storage.

In some examples of the method, apparatuses, and non-transitory computer-readable medium described herein, to determine which data blocks of the second snapshot were updated relative to the first snapshot, the fourth signaling may instruct the first cloud environment or the third cloud environment to compare, based on the first snapshot and the second snapshot being concurrently stored in the first type of cloud storage, the data blocks of the second snapshot to corresponding data blocks of the first snapshot, where the updated data blocks include one or more data blocks of the second snapshot that may be different from one or more corresponding data blocks of the first snapshot.

In some examples of the method, apparatuses, and non-transitory computer-readable medium described herein, to determine which data blocks of the second snapshot were updated relative to the first snapshot, the fourth signaling may instruct the first cloud environment or the third cloud environment to read a first fingerprint file associated with the first snapshot, the first fingerprint file including a respective first first hash value for each data block of the first snapshot, and compare the first fingerprint file to a second fingerprint file associated with the second snapshot that includes a respective second hash value for each data block of the second snapshot, where the updated data blocks include one or more data blocks of the second snapshot having respective second hash values that may be different from respective first hash values of one or more corresponding data blocks of the first snapshot.

Some examples of the method, apparatuses, and non-transitory computer-readable medium described herein may further include operations, features, means, or instructions for transmitting, from the DMS, signaling that instructs the first cloud environment to create a fingerprint file associated with the first snapshot that includes a respective hash value for each data block of the first snapshot and to store the fingerprint file to the second type of cloud storage.

Some examples of the method, apparatuses, and non-transitory computer-readable medium described herein may further include operations, features, means, or instructions for generating, by the DMS, metadata associated with the first snapshot that indicates a storage location of the first snapshot within the first type of cloud storage and a first time at which the first snapshot was captured, where determining that the first snapshot may have been stored in the first type of cloud storage for the duration that satisfies the threshold duration may be based on the metadata.

Some examples of the method, apparatuses, and non-transitory computer-readable medium described herein may further include operations, features, means, or instructions for generating, by the DMS, metadata associated with the first snapshot that indicates a storage location of the first snapshot within the second type of cloud storage, a storage location of a fingerprint file associated with the first snapshot within the second type of cloud storage, or a combination thereof.

In some examples of the method, apparatuses, and non-transitory computer-readable medium described herein, the second signaling may be configured to cause a temporary computing instance to be created on the first cloud environment or a third cloud environment and the temporary computing instance may be configured to perform the storage of the first snapshot to the second type of cloud storage.

In some examples of the method, apparatuses, and non-transitory computer-readable medium described herein, the second signaling may instruct the first cloud environment to store, to the second type of cloud storage, data blocks of the first snapshot that store data associated with the computing object and to skip storing, to the second type of cloud storage, data blocks of the first snapshot that do not store data associated with the computing object.

Some examples of the method, apparatuses, and non-transitory computer-readable medium described herein may further include operations, features, means, or instructions for determining, by the DMS, that a retention duration since the capture of the first snapshot may have expired, where the retention duration may be greater than the threshold duration, and transmitting, from the DMS to the first cloud environment or the second cloud environment and based on the expiration of the retention duration, signaling that instructs the first cloud environment or the second cloud environment to delete the first snapshot from the second type of cloud storage.

Some examples of the method, apparatuses, and non-transitory computer-readable medium described herein may further include operations, features, means, or instructions for determining, based on metadata associated with the first snapshot, a storage location within the second type of cloud storage of a data block of the first snapshot, and transmitting, by the DMS, signaling that instructs the first cloud environment or the second cloud environment to read the data block from the storage location and recover the data block to the first cloud environment or a third cloud environment in an original format according to which the data block was stored to the first type of cloud storage.

Some examples of the method, apparatuses, and non-transitory computer-readable medium described herein may further include operations, features, means, or instructions for transmitting, from the DMS, signaling that instructs the first cloud environment to delete the first snapshot from the first type of cloud storage after the first snapshot may be stored to the second type of cloud storage.

In some examples of the method, apparatuses, and non-transitory computer-readable medium described herein, the second signaling may instruct the first cloud environment to store the first snapshot to the second type of cloud storage in accordance with a second type of file format that may be different than a first type of file format according to which the first snapshot may be stored in the first type of cloud storage.

In some examples of the method, apparatuses, and non-transitory computer-readable medium described herein, the second signaling may instruct the first cloud environment to compress data blocks of the first snapshot and to store the compressed data blocks to the second type of cloud storage.

In some examples of the method, apparatuses, and non-transitory computer-readable medium described herein, the threshold duration may be in accordance with an SLA associated with the DMS and the first cloud environment.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   transmitting, from a data management system to a first cloud environment comprising a first type of cloud storage, first signaling that instructs the first cloud environment to capture a first snapshot of a computing object within the first cloud environment and to store the first snapshot in the first type of cloud storage;
   determining, by the data management system, that the first snapshot has been stored in the first type of cloud storage for a duration of time that satisfies a threshold duration of time; and
   transmitting, from the data management system and based at least in part on the first snapshot being stored in the first type of cloud storage for the duration that satisfies the threshold duration, second signaling that causes a temporary computing instance to be created on the first cloud environment or a third cloud environment and instructs the temporary computing instance to cause the first snapshot to be stored to a second type of cloud storage, wherein the second type of cloud storage is within the first cloud environment or a second cloud environment, and wherein the second type of cloud storage is associated with a longer access latency than the first type of cloud storage.

2. The method of claim 1, further comprising:
   transmitting, from the data management system to the first cloud environment, third signaling that instructs the first cloud environment to capture a second snapshot of the computing object and to store the first snapshot in the first type of cloud storage; and
   transmitting, from the data management system and based at least in part on the second snapshot being stored in the first type of cloud storage for the duration that satisfies the threshold duration, fourth signaling that instructs the first cloud environment to store the second snapshot to the second type of cloud storage,
   wherein the fourth signaling instructs the first cloud environment or the third cloud environment to determine which data blocks of the second snapshot were updated relative to the first snapshot and to store the updated data blocks to the second type of cloud storage.

3. The method of claim 2, wherein, to determine which data blocks of the second snapshot were updated relative to the first snapshot, the fourth signaling instructs the first cloud environment or the third cloud environment to:
   compare, based at least in part on the first snapshot and the second snapshot being concurrently stored in the first type of cloud storage, the data blocks of the second snapshot to corresponding data blocks of the first snapshot, wherein the updated data blocks comprise one or more data blocks of the second snapshot that are different from one or more corresponding data blocks of the first snapshot.

4. The method of claim 2, wherein, to determine which data blocks of the second snapshot were updated relative to the first snapshot, the fourth signaling instructs the first cloud environment or the third cloud environment to:
read a first fingerprint file associated with the first snapshot, the first fingerprint file comprising a respective first hash value for each data block of the first snapshot; and
compare the first fingerprint file to a second fingerprint file associated with the second snapshot that comprises a respective second hash value for each data block of the second snapshot, wherein the updated data blocks comprise one or more data blocks of the second snapshot having respective second hash values that are different from respective first hash values of one or more corresponding data blocks of the first snapshot.

5. The method of claim 1, further comprising:
transmitting, from the data management system, signaling that instructs the first cloud environment to create a fingerprint file associated with the first snapshot that comprises a respective hash value for each data block of the first snapshot and to store the fingerprint file to the second type of cloud storage.

6. The method of claim 1, further comprising:
generating, by the data management system, metadata associated with the first snapshot that indicates a storage location of the first snapshot within the first type of cloud storage and a first time at which the first snapshot was captured, wherein determining that the first snapshot has been stored in the first type of cloud storage for the duration that satisfies the threshold duration is based at least in part on the metadata.

7. The method of claim 1, further comprising:
generating, by the data management system, metadata associated with the first snapshot that indicates a storage location of the first snapshot within the second type of cloud storage, a storage location of a fingerprint file associated with the first snapshot within the second type of cloud storage, or a combination thereof.

8. The method of claim 1, wherein the second signaling instructs the first cloud environment to store, to the second type of cloud storage, data blocks of the first snapshot that store data associated with the computing object and to skip storing, to the second type of cloud storage, data blocks of the first snapshot that do not store data associated with the computing object.

9. The method of claim 1, further comprising:
determining, by the data management system, that a retention duration since the capture of the first snapshot has expired, wherein the retention duration is greater than the threshold duration; and
transmitting, from the data management system to the first cloud environment or the second cloud environment and based at least in part on the expiration of the retention duration, signaling that instructs the first cloud environment or the second cloud environment to delete the first snapshot from the second type of cloud storage.

10. The method of claim 1, further comprising:
determining, based at least in part on metadata associated with the first snapshot, a storage location within the second type of cloud storage of a data block of the first snapshot; and
transmitting, by the data management system, signaling that instructs the first cloud environment or the second cloud environment to read the data block from the storage location and recover the data block to the first cloud environment or the third cloud environment in an original format according to which the data block was stored to the first type of cloud storage.

11. The method of claim 1, further comprising:
transmitting, from the data management system, signaling that instructs the first cloud environment to delete the first snapshot from the first type of cloud storage after the first snapshot is stored to the second type of cloud storage.

12. The method of claim 1, wherein the second signaling instructs the first cloud environment to store the first snapshot to the second type of cloud storage in accordance with a second type of file format that is different than a first type of file format according to which the first snapshot is stored in the first type of cloud storage.

13. The method of claim 1, wherein the second signaling instructs the first cloud environment to compress data blocks of the first snapshot and to store the compressed data blocks to the second type of cloud storage.

14. The method of claim 1, wherein the threshold duration is in accordance with a service level agreement associated with the data management system and the first cloud environment.

15. An apparatus for data management, comprising:
at least one processor;
memory coupled with the at least one processor; and
instructions stored in the memory and executable by the at least one processor to cause the apparatus to:
transmit, from a data management system to a first cloud environment comprising a first type of cloud storage, first signaling that instructs the first cloud environment to capture a first snapshot of a computing object within the first cloud environment and to store the first snapshot in the first type of cloud storage;
determine, by the data management system, that the first snapshot has been stored in the first type of cloud storage for a duration of time that satisfies a threshold duration of time; and
transmit, from the data management system and based at least in part on the first snapshot being stored in the first type of cloud storage for the duration that satisfies the threshold duration, second signaling that causes a temporary computing instance to be created on the first cloud environment or a third cloud environment and instructs the temporary computing instance to cause the first snapshot to be stored to a second type of cloud storage, wherein the second type of cloud storage is within the first cloud environment or a second cloud environment, and wherein the second type of cloud storage is associated with a longer access latency than the first type of cloud storage.

16. The apparatus of claim 15, wherein the instructions are further executable by the at least one processor to cause the apparatus to:
transmit, from the data management system to the first cloud environment, third signaling that instructs the first cloud environment to capture a second snapshot of the computing object and to store the first snapshot in the first type of cloud storage; and
transmit, from the data management system and based at least in part on the second snapshot being stored in the first type of cloud storage for the duration that satisfies the threshold duration, fourth signaling that:
   instructs the first cloud environment to store the second snapshot to the second type of cloud storage; and
   instructs the first cloud environment or the third cloud environment to determine which data blocks of the second snapshot were updated relative to the first snapshot and to store the updated data blocks to the second type of cloud storage.

17. The apparatus of claim 15, wherein the instructions are further executable by the at least one processor to cause the apparatus to:
   transmit, from the data management system, signaling that instructs the first cloud environment to create a fingerprint file associated with the first snapshot that comprises a respective hash value for each data block of the first snapshot and to store the fingerprint file to the second type of cloud storage.

18. The apparatus of claim 15, wherein the instructions are further executable by the at least one processor to cause the apparatus to:
   determine, based at least in part on metadata associated with the first snapshot, a storage location within the second type of cloud storage of a data block of the first snapshot; and
   transmit, by the data management system, signaling that instructs the first cloud environment or the second cloud environment to read the data block from the storage location and recover the data block to the first cloud environment or the third cloud environment in an original format according to which the data block was stored to the first type of cloud storage.

19. A non-transitory computer-readable medium storing code for data management, the code comprising instructions executable by at least one processor to:
   transmit, from a data management system to a first cloud environment comprising a first type of cloud storage, first signaling that instructs the first cloud environment to capture a first snapshot of a computing object within the first cloud environment and to store the first snapshot in the first type of cloud storage;
   determine, by the data management system, that the first snapshot has been stored in the first type of cloud storage for a duration of time that satisfies a threshold duration of time; and
   transmit, from the data management system and based at least in part on the first snapshot being stored in the first type of cloud storage for the duration that satisfies the threshold duration, second signaling that causes a temporary computing instance to be created on the first cloud environment or a third cloud environment and instructs the temporary computing instance to cause the first snapshot to be stored to a second type of cloud storage, wherein the second type of cloud storage is within the first cloud environment or a second cloud environment, and wherein the second type of cloud storage is associated with a longer access latency than the first type of cloud storage.

\* \* \* \* \*